US012694838B2

(12) United States Patent
Seo et al.

(10) Patent No.: US 12,694,838 B2
(45) Date of Patent: Jul. 28, 2026

(54) DISPLAY DEVICE INCLUDING DEMULTIPLEXER OUTPUTTING TO DIFFERENT COLOR PIXEL COLUMNS

(71) Applicant: SAMSUNG DISPLAY CO., LTD., Yongin-si (KR)

(72) Inventors: Hae Kwan Seo, Yongin-si (KR); Jin Young Roh, Yongin-si (KR); Young Ha Sohn, Yongin-si (KR); Jin Wook Yang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/804,631

(22) Filed: Aug. 14, 2024

(65) Prior Publication Data

US 2024/0404478 A1 Dec. 5, 2024

Related U.S. Application Data

(63) Continuation of application No. 18/145,606, filed on Dec. 22, 2022, now Pat. No. 12,094,422.

(30) Foreign Application Priority Data

Mar. 10, 2022 (KR) ........................ 10-2022-0029880

(51) Int. Cl.

| | |
|---|---|
| *G09G 3/3275* | (2016.01) |
| *G09G 3/3233* | (2016.01) |
| *G09G 3/3266* | (2016.01) |

(52) U.S. Cl.

CPC ......... *G09G 3/3275* (2013.01); *G09G 3/3233* (2013.01); *G09G 3/3266* (2013.01);

(Continued)

(58) Field of Classification Search

CPC .................................................... G09G 3/3275

(Continued)

(56) References Cited

U.S. PATENT DOCUMENTS

| | | | |
|---|---|---|---|
| 9,218,758 | B2 | 12/2015 | Fujii |
| 10,410,578 | B2 | 9/2019 | Song et al. |

(Continued)

FOREIGN PATENT DOCUMENTS

| | | |
|---|---|---|
| KR | 10-2019-0062679 | 6/2019 |
| KR | 10-2048942 | 11/2019 |

(Continued)

OTHER PUBLICATIONS

Notice of Allowance dated Nov. 9, 2023 in related U.S. Appl. No. 18/303,396.

(Continued)

*Primary Examiner* — Long D Pham

(74) *Attorney, Agent, or Firm* — F. CHAU & ASSOCIATES, LLC

(57) ABSTRACT

A display device includes a display panel including a first pixel column in which first and third color pixels are alternately disposed, a second pixel column in which second color pixels are disposed, a third pixel column in which the third and first color pixels are alternately disposed, and a fourth pixel column in which the second color pixels are disposed. The display device further includes a scan driver applying a scan signal to scan lines, a data driver including a first source channel supplying a first color data signal and a second color data signal to a first data line, and a second source channel supplying the second color data signal and a third color data signal to a second data line, and a demultiplexer successively selecting the first and second sub-data lines during a period in which the scan signal is supplied to each scan line.

14 Claims, 24 Drawing Sheets

(52) U.S. Cl.
CPC ............... *G09G 2300/0452* (2013.01); *G09G 2300/0819* (2013.01); *G09G 2300/0842* (2013.01); *G09G 2310/0297* (2013.01); *G09G 2310/08* (2013.01); *G09G 2320/043* (2013.01)

(58) Field of Classification Search
USPC .......................................................... 345/690
See application file for complete search history.

(56) References Cited

U.S. PATENT DOCUMENTS

| | | | |
|---|---|---|---|
| 10,867,560 | B2 | 12/2020 | Yoon et al. |
| 11,423,821 | B2 | 8/2022 | Oh et al. |
| 12,094,422 | B2 * | 9/2024 | Seo ...................... G09G 3/3266 |
| 2011/0164015 | A1 | 7/2011 | Kim |
| 2014/0333676 | A1 | 11/2014 | Fujii |
| 2015/0035734 | A1 | 2/2015 | Lee et al. |
| 2016/0078826 | A1 | 3/2016 | Yoo et al. |
| 2016/0321977 | A1 | 11/2016 | Kong et al. |
| 2017/0243528 | A1 | 8/2017 | Ji et al. |
| 2017/0345357 | A1 | 11/2017 | Kong et al. |
| 2018/0075817 | A1 | 3/2018 | Kim et al. |
| 2018/0315390 | A1 | 11/2018 | Kong et al. |
| 2018/0330654 | A1 | 11/2018 | Moon et al. |
| 2019/0080652 | A1 | 3/2019 | Kim et al. |
| 2019/0164502 | A1 | 5/2019 | Yoon et al. |
| 2019/0189059 | A1 | 6/2019 | Na et al. |
| 2020/0074908 | A1 | 3/2020 | Kang |
| 2020/0286418 | A1 | 9/2020 | Lee et al. |
| 2021/0233455 | A1 | 7/2021 | Yang et al. |
| 2021/0366343 | A1 | 11/2021 | Oh et al. |
| 2022/0148503 | A1 | 5/2022 | Seo et al. |
| 2022/0157229 | A1 | 5/2022 | Ogawa et al. |
| 2022/0309981 | A1 * | 9/2022 | Li ........................ G09G 3/2003 |
| 2022/0310003 | A1 | 9/2022 | Harada et al. |
| 2023/0081342 | A1 | 3/2023 | Lin et al. |
| 2023/0122018 | A1 | 4/2023 | Choi |
| 2023/0178033 | A1 | 6/2023 | Kim et al. |
| 2023/0290313 | A1 | 9/2023 | Seo et al. |

FOREIGN PATENT DOCUMENTS

| | | | |
|---|---|---|---|
| KR | 10-2020-0015870 | | 2/2020 |
| KR | 10-2020-0081856 | | 7/2020 |
| KR | 10-2021-0144402 | | 11/2021 |
| KR | 10-2357345 | | 2/2022 |
| KR | 10-2022-0064463 | | 5/2022 |
| WO | WO 2022/032814 | * | 2/2022 |
| WO | 2022115118 | | 6/2022 |

OTHER PUBLICATIONS

Notice of Allowance dated Mar. 26, 2025 issued in related U.S. Appln. U.S. Appl. No. 18/609,900.
Office Action dated Dec. 18, 2024 in related U.S. Appl. No. 18/609,900.
The Notice of Allowance (2nd) issued in corresponding U.S. Appl. No. 18/609,900 on Jul. 21, 2025.

* cited by examiner

PXC1: PX11, PX21, PX31, PX41
PXC2: PX12, PX22, PX32, PX42
PXC3: PX13, PX23, PX33, PX43
PXC4: PX14, PX24, PX34, PX44
PXC5: PX15, PX25, PX35, PX45

AE: AE11, AE12, AE21, AE22, AE3
CNT: CNT11, CNT12, CNT21, CNT22, CNT3
EL: EL_R, EL_G, EL_B

PXC1: PX11, PX21, PX31, PX41
PXC2: PX12, PX22, PX32, PX42
PXC3: PX13, PX23, PX33, PX43
PXC4: PX14, PX24, PX34, PX44
PXC5: PX15, PX25, PX35, PX45

DISPLAY DEVICE INCLUDING DEMULTIPLEXER OUTPUTTING TO DIFFERENT COLOR PIXEL COLUMNS

CROSS-REFERENCE TO RELATED APPLICATION

This application is a continuation application of U.S. application Ser. No. 18/145,606 filed on Dec. 22, 2022, which claims priority under 35 U.S.C. § 119 to Korean Patent Application No. 10-2022-0029880, filed on Mar. 10, 2022, the disclosures of which are incorporated by reference herein in their entireties.

TECHNICAL FIELD

Embodiments of the present disclosure relate to a display device.

DISCUSSION OF RELATED ART

With the development of information technology, the use of display devices that visually display information to a user has increased. Such display devices include, for example, a liquid crystal display device and an organic light-emitting display device.

Display devices may have various pixel structures in such a way that sub-pixels configured to emit red light, green light, and blue light are disposed in various shapes and arrangements. Among such pixel structures, a PENTILE pixel structure in which sub-pixels are arranged in a diamond shape is known as having excellent perceptual image quality.

SUMMARY

Various embodiments of the present disclosure are directed to a display device having a PENTILE pixel structure in which, to prevent a red data signal and a blue data signal having different voltage levels from being switched during each one horizontal period, some red sub-pixels and some blue sub-pixels each have an anode extension structure so that only a data signal pertaining to one color may be more efficiently supplied to each data line by using a demultiplexer.

However, objects of the present disclosure are not limited to the above-described objects, and various modifications are possible without departing from the spirit and scope of the present disclosure.

An embodiment of the present disclosure may provide a display device including: a display panel including a first pixel column in which first color pixels and third color pixels are alternately disposed in a listed order, a second pixel column in which second color pixels are disposed, a third pixel column in which the third color pixels and the first color pixels are alternately disposed in a listed order, and a fourth pixel column in which the second color pixels are disposed. The display device further includes a scan driver configured to successively apply a scan signal having a gate-on voltage to scan lines connected to the first color pixels, the second color pixels, and the third color pixels. The display device further includes a data driver including a first source channel configured to supply a first color data signal corresponding to the first color pixels and a second color data signal corresponding to the second color pixels to a first data line, and a second source channel configured to supply the second color data signal and a third color data signal corresponding to the third color pixels to a second data line. The display device further includes a demultiplexer connected both to a plurality of first sub-data lines connected to the first color pixels or the third color pixels, and to a plurality of second sub-data lines connected to the second color pixels, and configured to successively select the first sub-data lines and the second sub-data lines during a period in which the scan signal having a gate-on level is supplied to each scan line.

The demultiplexer may repeatedly select the first sub-data lines and the second sub-data lines on a scan line basis.

The first sub-data lines may include a 1-1-th sub-data line connected to the first color pixels, and a 1-2-th sub-data line connected to the third color pixels.

The 1-1-th sub-data line may be supplied with only the first color data signal, and the 1-2-th sub-data line may be supplied with only the third color data signal.

An anode of each of the first color pixels disposed in the first pixel column may be electrically connected to the 1-1-th sub-data line, and an anode of each of the third color pixels disposed on the first pixel column may be electrically connected to the 1-2-th sub-data line.

The second sub-data lines may include a 2-1-th sub-data line connected to the second color pixels disposed in the second pixel column, and a 2-2-th sub-data line connected to the second color pixels disposed in the fourth pixel column.

The 2-1-th sub-data lines and the 2-2-th sub-data lines may be supplied with only the second color data signal.

An anode of each of the second color pixels disposed in the second pixel column may be electrically connected to the 2-1-th sub-data line, and an anode of each of the second color pixels disposed in the fourth pixel column may be electrically connected to the 2-2-th sub-data line.

The demultiplexer may include first select transistors disposed between the first data line and the 1-1-th sub-data line and between the second data line and the 1-2-th sub-data line, and second select transistors disposed between the first data line and the 2-1-th sub-data line and between the second data line and the 2-2-th sub-data line.

The first color may be red, the second color may be green, and the third color may be blue.

An embodiment of the present disclosure may provide a display device including a display panel including a first pixel column in which first color pixels and third color pixels are alternately disposed in a listed order, a second pixel column in which second color pixels are disposed, a third pixel column in which the third color pixels and the first color pixels are alternately disposed in a listed order, a fourth pixel column in which the second color pixels are disposed, a fifth pixel column in which the first color pixels and the third color pixels are alternately disposed in a listed order, a sixth pixel column in which the second color pixels are disposed, a seventh pixel column in which the third color pixels and the first color pixels are alternately disposed in a listed order, and an eighth pixel column in which the second color pixels are disposed. The display device further includes a scan driver configured to successively apply a scan signal having a gate-on voltage to scan lines connected to the first color pixels, the second color pixels, and the third color pixels. The display device further includes a data driver including a first source channel configured to supply a first color data signal corresponding to the first color pixels to a first data line, a second source channel configured to supply a second color data signal corresponding to the second color pixels to a second data line, a third source channel configured to supply a third color data signal corresponding to the third color pixels to a third data line, and a fourth source channel configured to supply the second color data signal corresponding to the second color pixels to a fourth data line. The display device further includes a demultiplexer connected both to a plurality of first sub-data lines connected to the first color pixels to the third color pixels that are included in a first group, and to a plurality of second sub-data lines connected to the first color pixels to the third color pixels included in a second group disposed adjacent to the first group in a pixel row direction, and configured to successively select the first sub-data lines and the second sub-data lines during a period in which the scan signal having a gate-on level is supplied to each scan line.

The demultiplexer may repeatedly select the first sub-data lines and the second sub-data lines on a scan line basis.

The first sub-data lines may include a 1-1-th sub-data line connected to the first color pixels disposed in the first pixel column, a 1-2-th sub-data line connected to the second color pixels disposed in the second pixel column, a 1-3-th sub-data line connected to the third color pixels disposed in the third pixel column, and a 1-4-th sub-data line connected to the second color pixels disposed in the fourth pixel column.

The 1-1-th sub-data line may be supplied with only the first color data signal, the 1-2-th sub-data line and the 1-4-th sub-data line each may be supplied with only the second color data signal, and the 1-3-th sub-data line may be supplied with only the third color data signal.

An anode of each of the first color pixels disposed in the first pixel column may be electrically connected to the 1-1-th sub-data line, and an anode of each of the third color pixels disposed in the first pixel column may be electrically connected to the 1-3-th sub-data line.

The second sub-data lines may include a 2-1-th sub-data line connected to the first color pixels disposed in the fifth pixel column, a 2-2-th sub-data line connected to the second color pixels disposed in the sixth pixel column, a 2-3-th sub-data line connected to the third color pixels disposed in the seventh pixel column, and a 2-4-th sub-data line connected to the second color pixels disposed in the eighth pixel column.

The 2-1-th sub-data line may be supplied with only the first color data signal, the 2-2-th sub-data line and the 2-4-th sub-data line each may be supplied with only the second color data signal, and the 2-3-th sub-data line may be supplied with only the third color data signal.

An anode of each of the second color pixels disposed in the second pixel column may be electrically connected to the 2-2-th sub-data line, and an anode of each of the second color pixels disposed in the fourth pixel column may be electrically connected to the 2-4-th sub-data line.

The demultiplexer may include first select transistors disposed between the first data line and the 1-1-th sub-data line, between the second data line and the 1-2-th sub-data line, between the third data line and the 1-3-th sub-data line, and between the fourth data line and the 1-4-th sub-data line, as well as second select transistors disposed between the first data line and the 2-1-th sub-data line, between the second data line and the 2-2-th sub-data line, between the third data line and the 2-3-th sub-data line, and between the fourth data line and the 2-4-th sub-data line.

The first color may be red, the second color may be green, and the third color may be blue.

BRIEF DESCRIPTION OF THE DRAWINGS

The above and other features of the present disclosure will become more apparent by describing in detail embodiments thereof with reference to the accompanying drawings.

DETAILED DESCRIPTION

Figure 1:
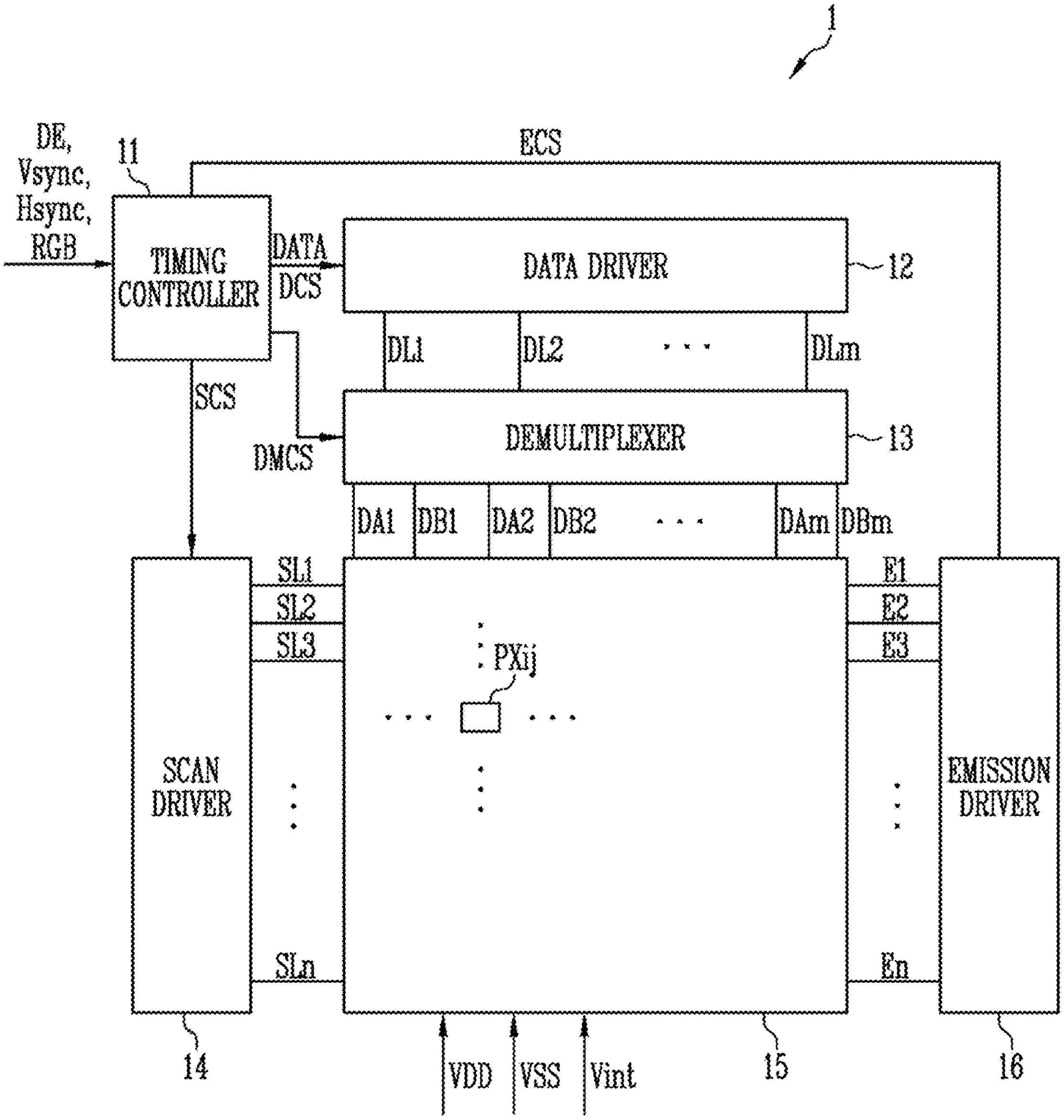
FIG. 1 is a diagram for describing a display device in accordance with an embodiment of the present disclosure.

Embodiments of the present disclosure will be described more fully hereinafter with reference to the accompanying drawings. Like reference numerals may refer to like elements throughout the accompanying drawings.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

In the present disclosure, the singular forms are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

It will be understood that when a component is referred to as being "on", "connected to", "coupled to", or "adjacent to"

another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

FIG. 1 is a diagram for describing a display device 1 in accordance with an embodiment of the present disclosure.

Referring to FIG. 1, the display device 1 in accordance with an embodiment of the present disclosure may include a timing controller 11, a data driver 12, a demultiplexer 13, a scan driver 14, a display panel 15, and an emission driver 16.

The timing controller 11 may receive an external input signal from an external processor. The external input signal may include, for example, a vertical synchronization signal Vsync, a horizontal synchronization signal Hsync, a data enable signal DE, input image data RGB, etc.

The vertical synchronization signal Vsync may include a plurality of pulses and indicate that a previous frame period ends and a current frame period starts based on a time point at which each pulse occurs. An interval between adjacent pulses in the vertical synchronization signal Vsync may correspond to one frame period. The horizontal synchronization signal Hysnc may include a plurality of pulses and indicate that a previous horizontal period ends and a new horizontal period starts based on a time point at which each pulse occurs. The data enable signal DE may indicate that the input image data RGB is supplied in a horizontal period. The input image data RGB may be supplied on a pixel row basis in response to a data enable signal in horizontal periods. The input image data RGB corresponding to one frame may refer to one input image.

The timing controller 11 may generate a first driving control signal SCS, a second driving control signal DCS, a third driving control signal ECS, and a fourth driving control signal DMCS in response to synchronization signals supplied from an external device. The first driving control signal SCS may be supplied to the scan driver 14. The second driving control signal DCS may be supplied to the data driver 12. The third driving control signal ECS may be supplied to the emission driver 16. The fourth driving control signal DMCS may be supplied to the demultiplexer 13.

The first driving control signal SCS may include a scan start pulse and clock signals. The scan start pulse may control a first timing of a scan signal to be output from the scan driver 14. The clock signals may be used to shift the scan start pulse.

The second driving control signal DCS may include a source start pulse and clock signals. The source start pulse may control a time point at which the sampling of data starts. The clock signals may be used to control a sampling operation.

The third driving control signal ECS may include an emission control start pulse and clock signals. The emission control start pulse may control a first timing of an emission control signal to be output from the emission driver 16. The clock signals may be used to shift the emission control start pulse.

Figure 7:
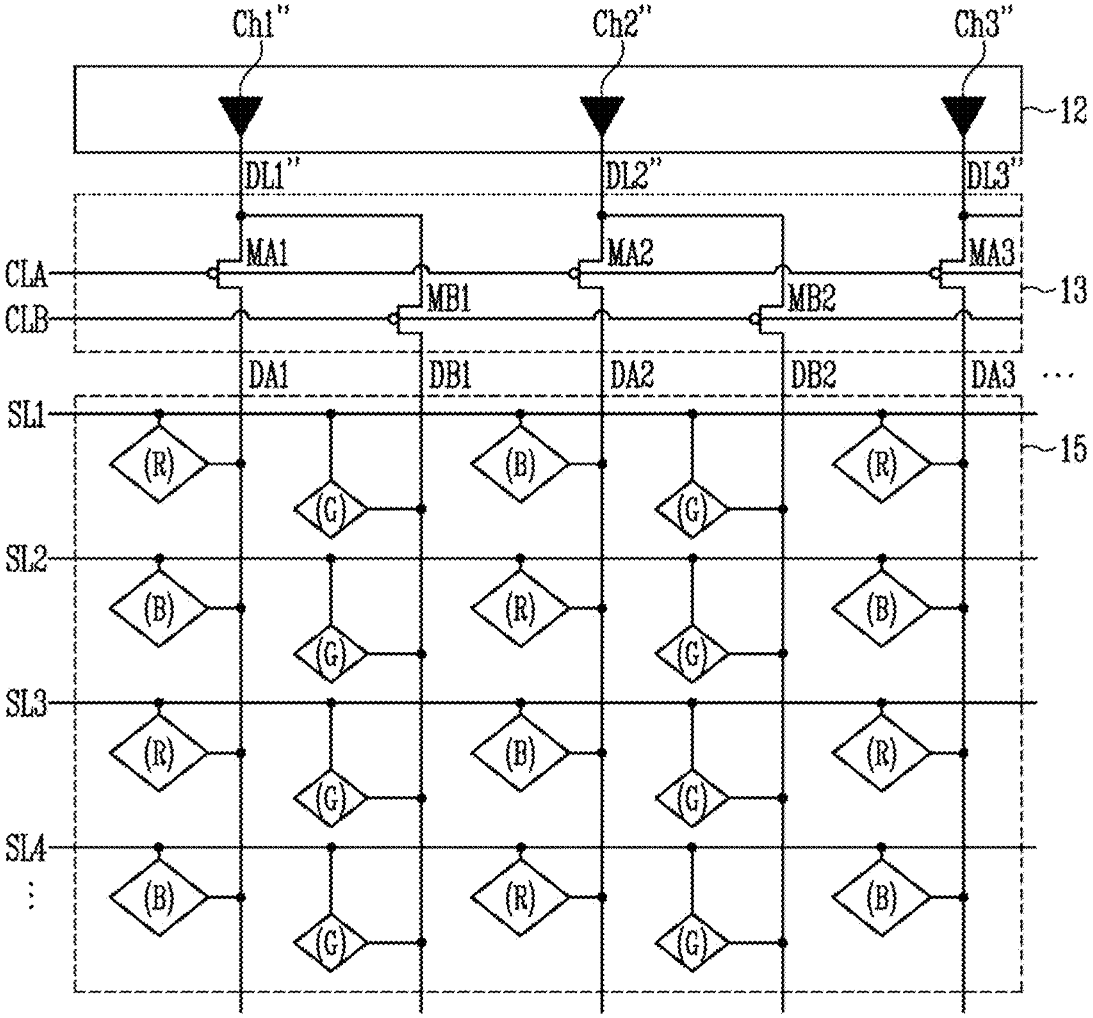
FIG. 7 is a schematic diagram for describing an embodiment in which a demultiplexer is added to the display device including the PENTILE pixel structure of FIG. 4A.

The fourth driving control signal DMCS may include a first select signal CLA (refer to FIG. 7), and a second select signal CLB (refer to FIG. 7). The first select signal may control an operation of turning on/off a plurality of first select transistors MA1, MA2, and MA3 (refer to FIG. 7) included in the demultiplexer 13. The second select signal may control an operation of turning on/off a plurality of second select transistors MB1, MB2, and MB3 (refer to FIG. 7) included in the demultiplexer 13.

The data driver 12 may receive a control signal and output image data DATA from the timing controller 11. The data driver 12 may convert digital output image data DATA into an analog data signal (or a data voltage).

The data driver 12 may be connected to a plurality of data lines DL1 to DLm, sample and hold the output image data DATA inputted in response to the second driving control signal DCS2, and transmit a plurality of data signals to the respective data lines DL1 to DLm. The data signals may be supplied to the data lines DL1 to DLm in synchronization with scan signals to be supplied to the scan lines SL1 to SLn.

The demultiplexer 13 may be connected to a plurality of sub-data lines DA1 to DAm and DB1 to DBm, and apply, through the sub-data lines DA1 to DAm and DB1 to DBm, respective data signals inputted from the data driver 12 in response to the fourth driving control signal DMCS to a sub-pixel PXij configured to emit red light, a sub-pixel PXij configured to emit green light, and a sub-pixel PXij configured to blue light. Here, each of m, i, and j is a natural number.

The scan driver 14 may receive a clock signal, a scan start signal, etc. from the timing controller 11 and generate scan signals to be provided to the scan lines SL1 to SLn, were n is a natural number. The scan signals each may be set to a gate-on voltage (e.g., a low voltage) corresponding to the type of a transistor to which the corresponding scan signal is to be supplied. A transistor that receives a scan signal may be set to a turned-on state when the scan signal is supplied thereto. For example, a gate-on voltage of a scan signal to be supplied to a P-channel metal oxide semiconductor (PMOS) transistor may be at a logic low level, and a gate-on voltage of a scan signal to be supplied to an N-channel metal oxide semiconductor (NMOS) transistor may be at a logic high level. Hereinafter, the expression "scan signal is supplied" may be understood to mean that the scan signal is supplied at a logic level that enables a transistor controlled by the scan signal to be turned on.

The display panel 15 may include scan lines SL1 to SLn, emission control lines E1 to En, and sub-data lines DA1 to DAm and DB1 to DBm, and include sub-pixels PXij connected to the scan lines SL1 to SLn, the emission control lines E1 to En, and the sub-data lines DA1 to DAm and DB1 to DBm (where m and n each is an integer greater than 1). Each of the sub-pixels PXij may include a driving transistor and a plurality of switching transistors. The sub-pixels PXij may receive first driving power VDD, second driving power VSS, and an initialization voltage Vint from a power supply. A voltage level of the second driving power VSS may be lower than a voltage level of the first driving power VDD. For example, the voltage of the first driving power VDD may be a positive voltage, and the voltage of the second driving power VSS may be a negative voltage.

The emission driver 16 may receive a clock signal, an emission stop signal, etc. from the timing controller 11 and generate emission control signals to be provided to emission control lines E1 to En. The emission control signals may be successively supplied to the emission control lines E1 to En.

The emission control signals each may be set to be a gate-off level (e.g., a high voltage). A transistor that receives the emission control signal may be turned off when the emission control signal is supplied thereto, and may be turned on in other cases. Hereinafter, the expression "emission control signal is supplied" may be understood to mean that the emission control signal is supplied at a logic level that enables a transistor controlled by the emission control signal to be turned off.

For convenience of description, FIG. 1 illustrates that the scan driver 14 and the emission driver 16 are each is provided as a single component. However, embodiments of the present disclosure are not limited thereto. For example, according to embodiments, at least some of the scan driver 14 and the emission driver 16 may be integrated into a driving circuit, a module, etc.

Figure 2:
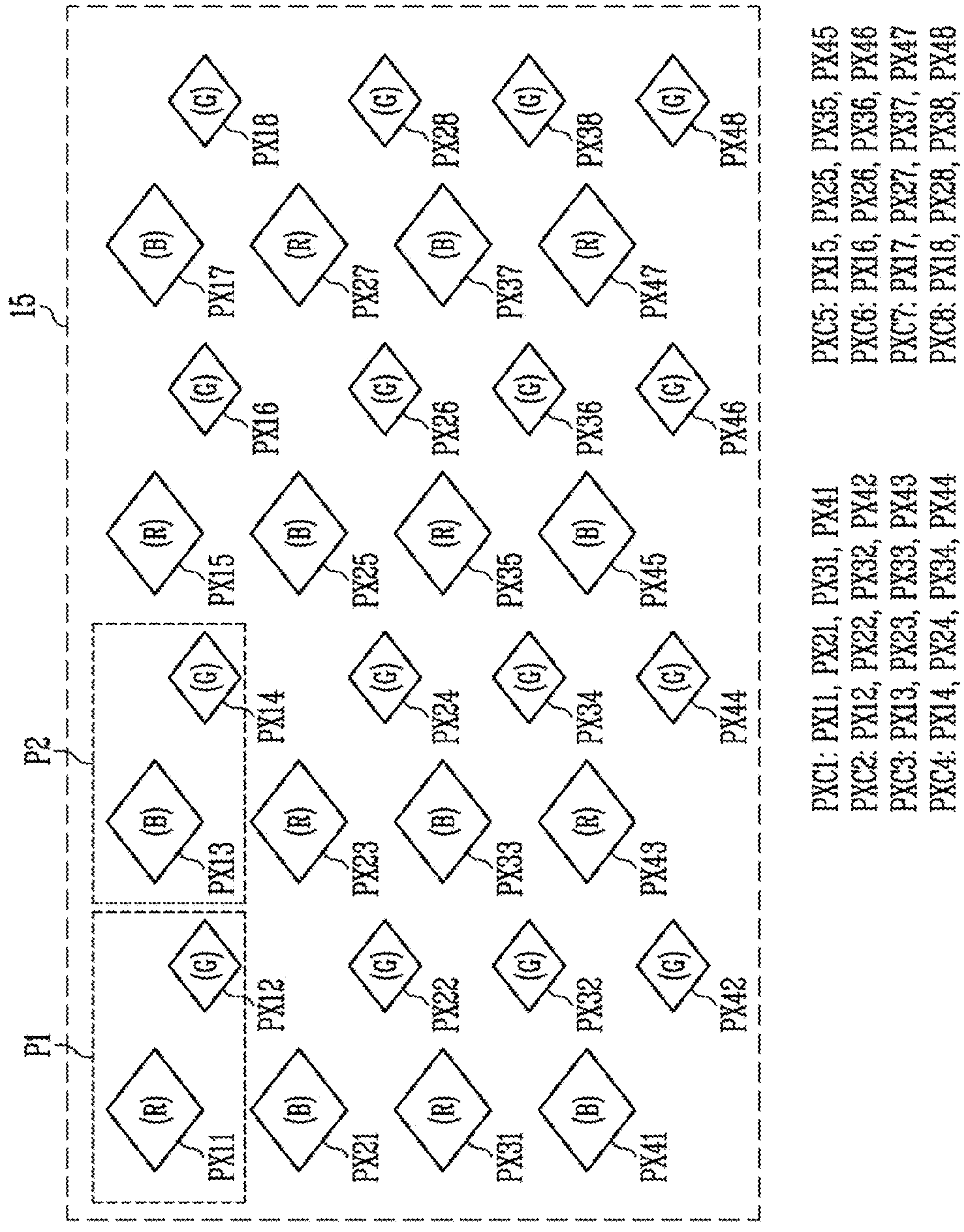
FIG. 2 is a diagram illustrating an example of a display panel included in the display device of FIG. 1.

FIG. 2 is a diagram illustrating an example of the display panel 15 included in the display device of FIG. 1.

Referring to FIGS. 1 and 2, there is illustrated the display panel 15 having a PENTILE structure. In the PENTILE structure in accordance with an embodiment, first pixels P1 each having, e.g., sub-pixels PX11 and PX12 configured to emit red light (R) and green light (G), and second pixels P2 each having, e.g., sub-pixels PX13 and PX14 configured to emit blue light (B) and green light (G), may be alternately arranged in a horizontal direction and a vertical direction. The sub-pixels described herein may also be referred to as color pixels. For example, in the PENTILE structure, the sub-pixels PXij that are configured to emit red light (R) and blue light (B) may be alternately arranged in an extension direction of the sub-data lines DA1 to DAm, and the sub-pixels PXij that are configured to emit green light (G) may be successively arranged in the extension direction of the sub-data lines DB1 to DBm.

The display panel 15 may include a first pixel column PXC1, a second pixel column PXC2, a third pixel column PXC3, a fourth pixel column PXC4, a fifth pixel column PXC5, a sixth pixel column PXC6, a seventh pixel column PXC7, and an eighth pixel column PXC8. Although FIG. 2 illustrates the first to eighth pixel columns PXC1, PXC2, PXC3, PXC4, PXC5, PXC6, PXC7, and PXC8, embodiments of the present disclosure are not limited thereto. For example, according to embodiments, the display panel 15 may include a larger number of pixel columns than 8 pixel columns.

In the first pixel column PXC1, the sub-pixels PXij configured to emit red light (R) and the sub-pixels PXij configured to emit blue light (B) may be alternately arranged in the extension direction of the sub-data lines DA1 to Dam in a listed order. Herein, the term "listed order" may mean that the first component disposed in the listed order is the first component mentioned. For example, as shown in FIG. 2, in the first pixel column PXC1, the first sub-pixel PXj disposed is a sub-pixel PX11 configured to emit red light (R). The first pixel column PXC1 may include an 11-th sub-pixel PX11, a 21-th sub-pixel PX21, a 31-th sub-pixel PX31, and a 41-th sub-pixel PX41.

In the second pixel column PXC2, the sub-pixels PXij configured to emit green light (G) may be successively arranged in the extension direction of the sub-data lines DB1 to DBm. The second pixel column PXC2 may include a 12-th sub-pixel PX12, a 22-th sub-pixel PX22, a 32-th sub-pixel PX32, and a 42-th sub-pixel PX42.

In the third pixel column PXC3, the sub-pixels PXij configured to emit blue light (B) and the sub-pixels PXij configured to emit red light (R) may be alternately arranged in the extension direction of the sub-data lines DA1 to Dam in a listed order. As described above, the term "listed order" may mean that the first component disposed in the listed order is the first component mentioned. For example, as shown in FIG. 2, in the third pixel column PXC3, the first sub-pixel PX13 disposed is configured to emit blue light (B). The third pixel column PXC3 may include a 13-th sub-pixel PX13, a 23-th sub-pixel PX23, a 33-th sub-pixel PX33, and a 43-th sub-pixel PX43. That is, in a case in which the sub-pixel PX13 (B) is disposed on a first row of the third pixel column PXC3, the sub-pixel PX11 (R) may be disposed on the first row of the first pixel column PXC1.

In the fourth pixel column PXC4, the sub-pixels PXij configured to emit green light (G) may be successively arranged in the extension direction of the sub-data lines DB1 to DBm. The fourth pixel column PXC4 may include a 14-th sub-pixel PX14, a 24-th sub-pixel PX24, a 34-th sub-pixel PX34, and a 44-th sub-pixel PX44.

The fifth pixel column PXC5 may include a 15-th sub-pixel PX15, a 25-th sub-pixel PX25, a 35-th sub-pixel PX35, and a 45-th sub-pixel PX45. The seventh pixel column PXC7 may include a 17-th sub-pixel PX17, a 27-th sub-pixel PX27, a 37-th sub-pixel PX37, and a 47-th sub-pixel PX47. In the fifth pixel column PXC5, the sub-pixels PX15 and PX35 (R) configured to emit red light (R) and the sub-pixels PX25 and PX45 (B) configured to emit blue light (B) may be alternately arranged, in the same manner as that of the first pixel column PXC1. In the seventh pixel column PXC7, the sub-pixels PX17 and PX37 (B) configured to emit blue light (B) and the sub-pixels PX27 and PX47 (R) configured to emit red light (R) may be alternately arranged, in the same manner as that of the third pixel column PXC3.

The sixth pixel column PXC6 may include a 16-th sub-pixel PX16, a 26-th sub-pixel PX26, a 36-th sub-pixel PX36, and a 46-th sub-pixel PX46. The eighth pixel column PXC8 may include an 18-th sub-pixel PX18, a 28-th sub-pixel PX28, a 38-th sub-pixel PX38, and a 48-th sub-pixel PX48. That is, in the sixth pixel column PXC6 and the eighth pixel column PXC8, the sub-pixels PX16, PX26, PX36, PX46, PX18, PX28, PX38, and PX48 (G) configured to emit green light (G) may be arranged in the same manner as that of the second pixel column PXC2 and the fourth pixel column PXC4.

Figure 3:
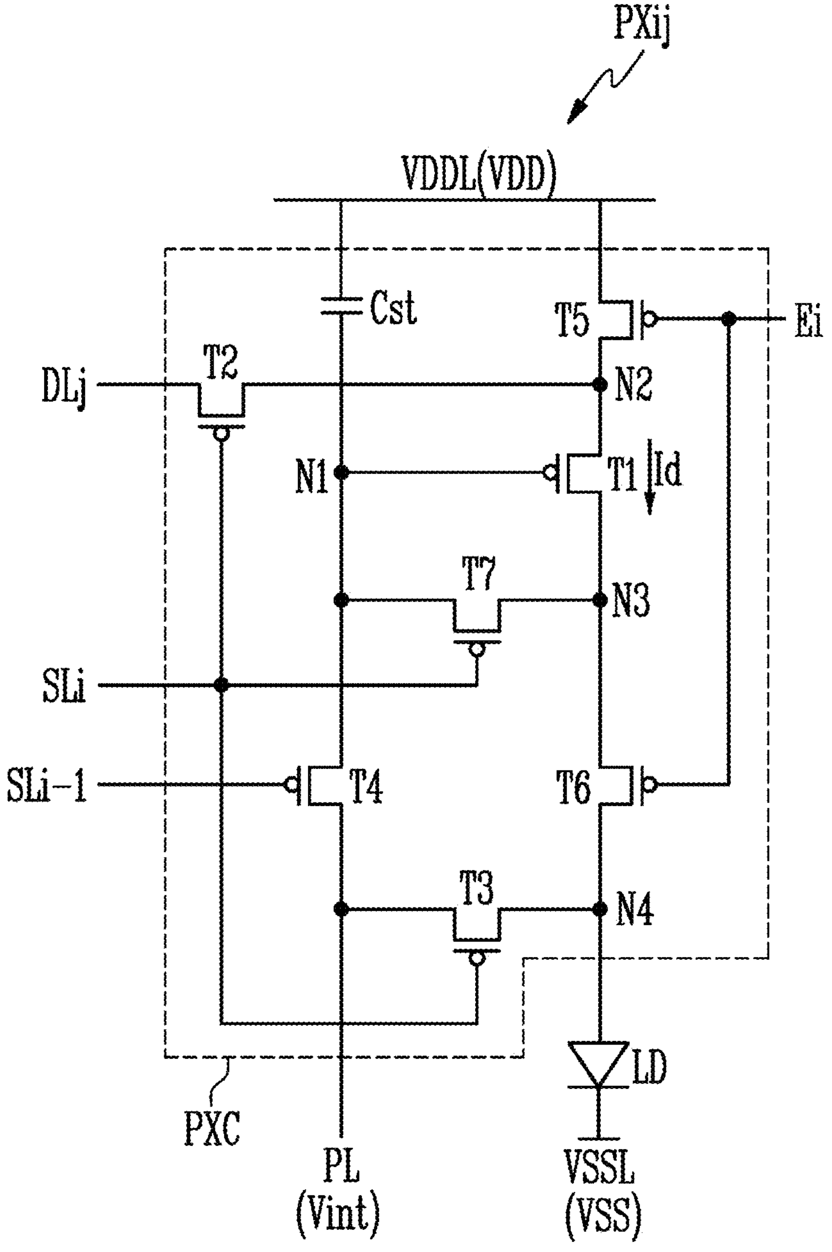
FIG. 3 is a diagram illustrating an example of a sub-pixel provided in the display device of FIG. 1.

FIG. 3 is a diagram illustrating an example of a sub-pixel PXij provided in the display device 1 of FIG. 1.

For convenience of explanation, FIG. 3 illustrates a sub-pixel disposed on an i-th horizontal line and connected to a j-th data line DLj, in which each of i and j is a natural number.

Referring to FIG. 3, the sub-pixel PXij provided in the display device 1 in accordance with embodiments of the present disclosure may include a light emitting element LD, transistors T1 to T7, and a storage capacitor Cst. The sub-pixel PXij in accordance with embodiments of the present disclosure is not limited to the structure illustrated in FIG. 3, and may have various structures. Hereinafter, for convenience of explanation, it is assumed that the sub-pixel PXij has the same structure as that of FIG. 3.

A first electrode (e.g., an anode) of the light emitting element LD may be connected to a fourth node N4, and a second electrode (e.g., a cathode) thereof may be connected to a second driving power line VSSL configured to supply the second driving power VSS. The light emitting element LD may emit light having a certain luminance corresponding to the amount of current supplied from the first transistor T1.

In an embodiment, the light emitting element LD may be an organic light emitting diode including an organic light emitting layer. Alternatively, the light emitting element LD may be an inorganic light emitting element formed of inorganic material. The light emitting element LD may have a shape in which a plurality of inorganic light emitting elements are connected in parallel and/or series between the second driving power line VSSL and the fourth node N4.

The first transistor (or the driving transistor) T1 may include a first electrode connected to a second node N2, and a second electrode connected to a third node N3. A gate electrode of the first transistor T1 is connected to a first node N1. The first transistor T1 may control, in response to the voltage of the first node N1, driving current Id flowing from a first driving power line VDDL to the second driving power line VSSL via the light emitting element LD. The first driving power line VDDL may be set to a voltage higher than the second driving power line VSSL.

The second transistor T2 may be connected between the j-th data line DLj and the second node N2. A gate electrode of the second transistor T2 may be connected to an i-th scan line SLi. The second transistor T2 may be turned on in response to a scan signal that has a gate-on level and is supplied to the i-th scan line SLi, and electrically connect the j-th data line DLj and the second node N2 to each other.

The third transistor T3 may be connected between the first electrode (e.g., the fourth node N4) of the light emitting element LD and a power line PL configured to supply an initialization voltage Vint. A gate electrode of the third transistor T3 may be connected to an i-th scan line SLi. The third transistor T3 may be turned on in response to a scan signal that has a gate-on level and is supplied to the i-th scan line SLi. As a result, the initialization voltage Vint may be supplied to the first electrode (e.g., the fourth node N4) of the light emitting element LD.

The fourth transistor T4 may be connected between the first node N1 and the power line PL. A gate electrode of the fourth transistor T4 may be connected to an i-th scan line SLi-1. The fourth transistor T4 may be turned on in response to a scan signal that has a gate-on level and is supplied to the i-1-th scan line Si-1. As a result, the initialization voltage Vint may be supplied to the first node N1.

The fifth transistor T5 may be connected between the second node N2 and the first driving power line VDDL configured to supply the first driving power VDD. A gate electrode of the fifth transistor T5 may be connected to an i-th emission control line Ei. The fifth transistor T5 may be turned on in response to an emission control signal that has a gate-on level and is supplied to the i-th emission control line Ei.

The sixth transistor T6 is connected between the second electrode (e.g., the third node N3) of the first transistor T1 and the first electrode (or the anode) of the light emitting element LD. Agate electrode of the sixth transistor T6 may be connected to the i-th emission control line Ei. The sixth transistor T6 may be turned on in response to an emission control signal that has a gate-on level and is supplied to the i-th emission control line Ei. Therefore, the fifth transistor T5 and the sixth transistor T6 may be simultaneously controlled.

The seventh transistor T7 may be connected between the second electrode (e.g., the third node N3) of the first transistor T1 and the first node N1. Agate electrode of the seventh transistor T7 may be connected to the i-th scan line SLi. The seventh transistor T7 may be turned on in response to a scan signal that has a gate-on level and is supplied to the i-th scan line SLi, and electrically connect the second electrode of the first transistor T1 and the first node N1 to each other. When the seventh transistor T7 is turned on, the first transistor T1 is connected in the form of a diode.

The storage capacitor Cst may be connected between the first driving power line VDDL and the first node N1.

In addition, the scan lines to which the transistors T2, T3, T4, and T7 are connected may be changed in various ways. For example, the fourth transistor T4 may be connected to a separate scan line rather than to the i-th scan line SLi-1. Similarly, the third transistor T3 may also be connected to a separate scan line rather than to the i-th scan line Si.

Figure 4A:
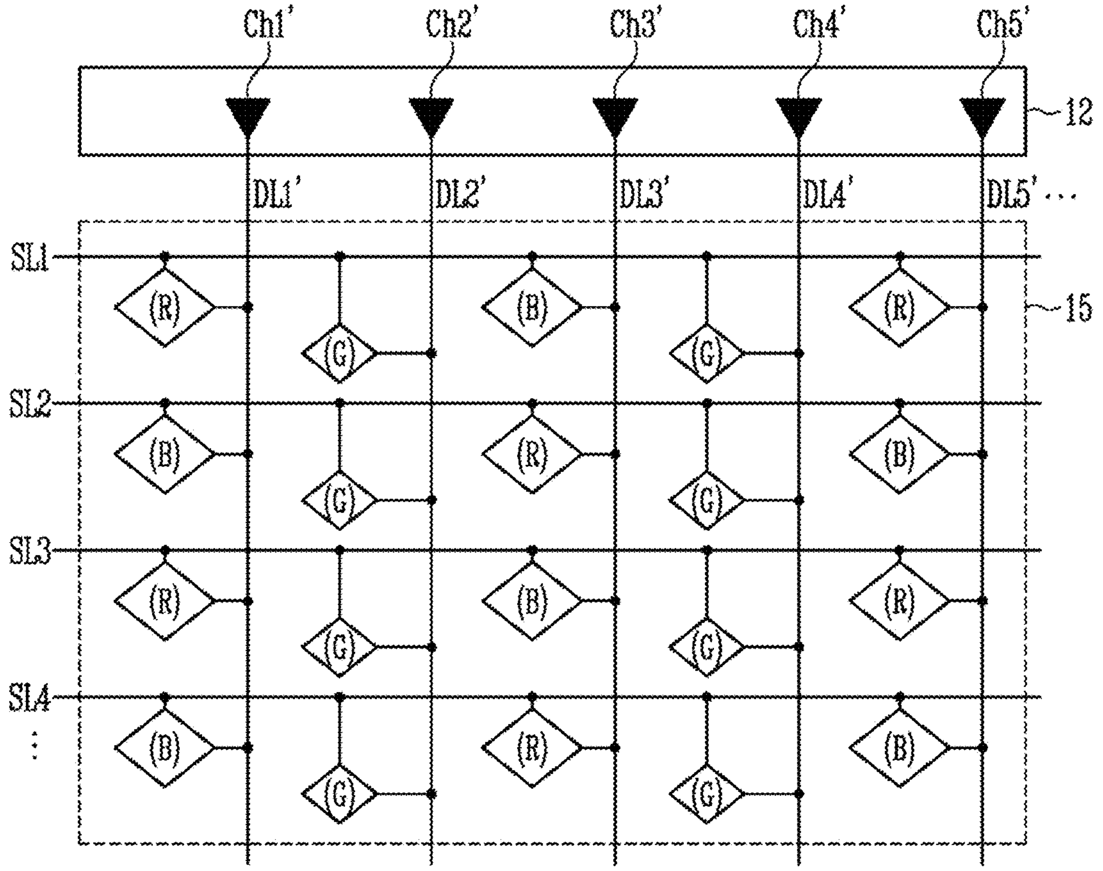
FIGS. 4A and 4B are schematic views for describing a modification of an anode connection structure of some sub-pixels in a PENTILE pixel structure.
Figure 4B:
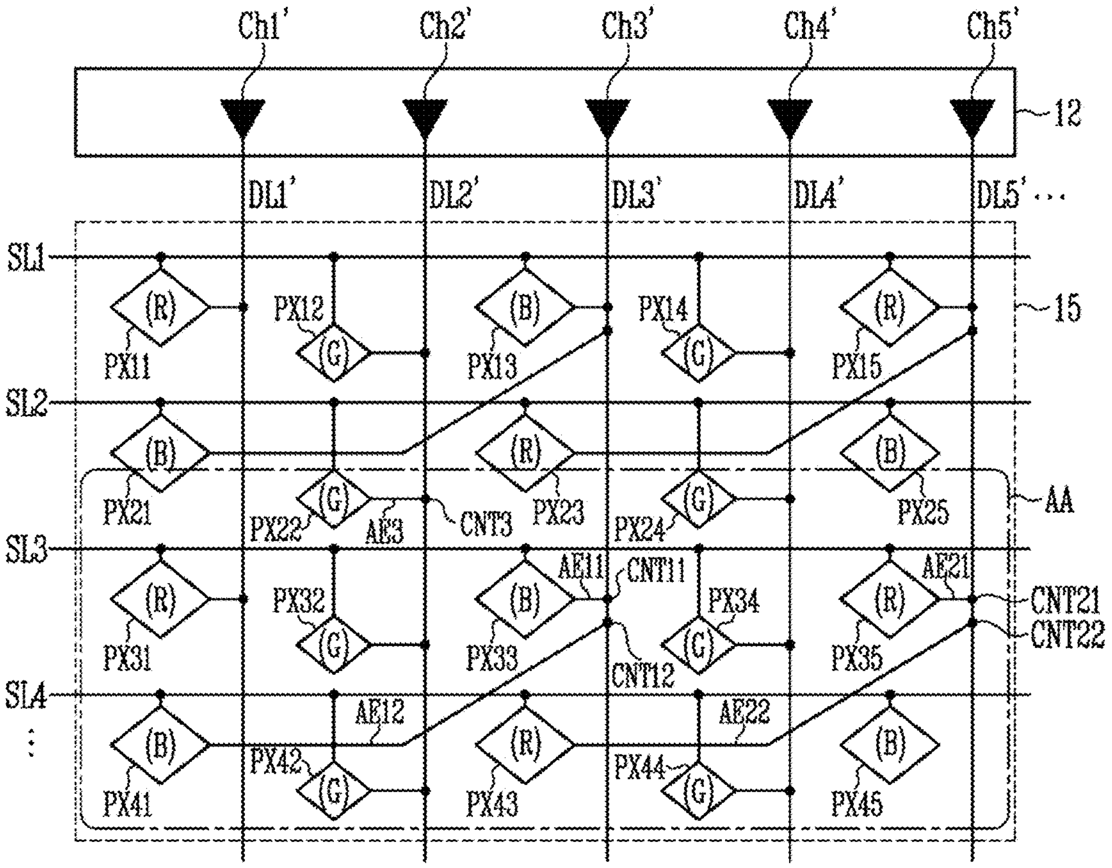
Figure 5A:
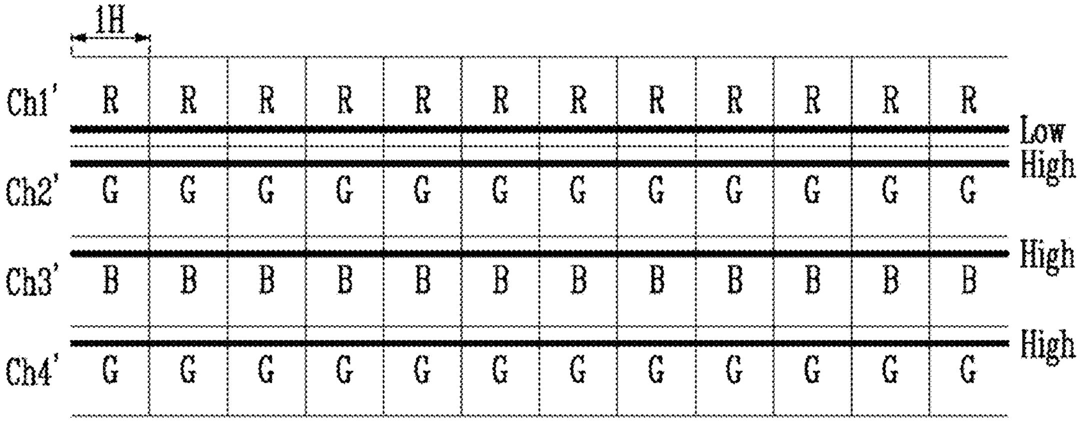
FIGS. 5A to 5C are diagrams for describing data signals to be provided to the respective source channels in accordance with an embodiment illustrated in FIG. 4B.
Figure 5B:
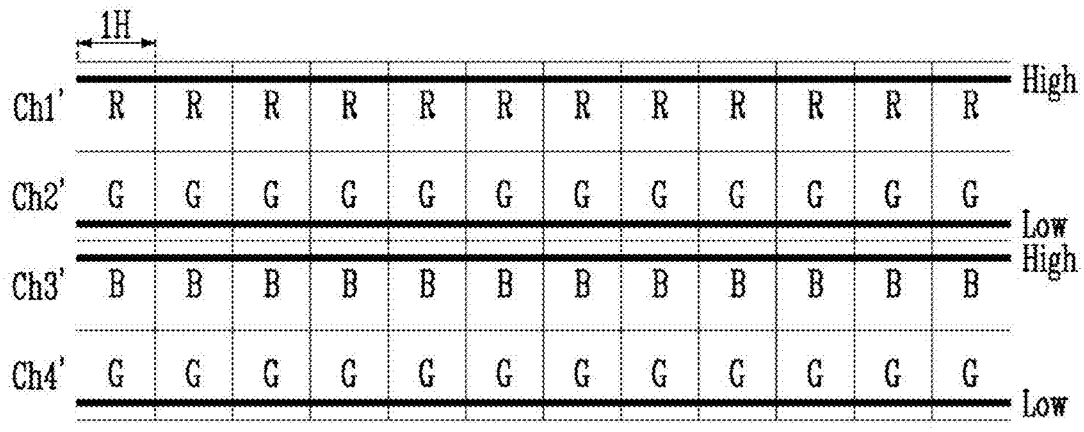
Figure 5C:
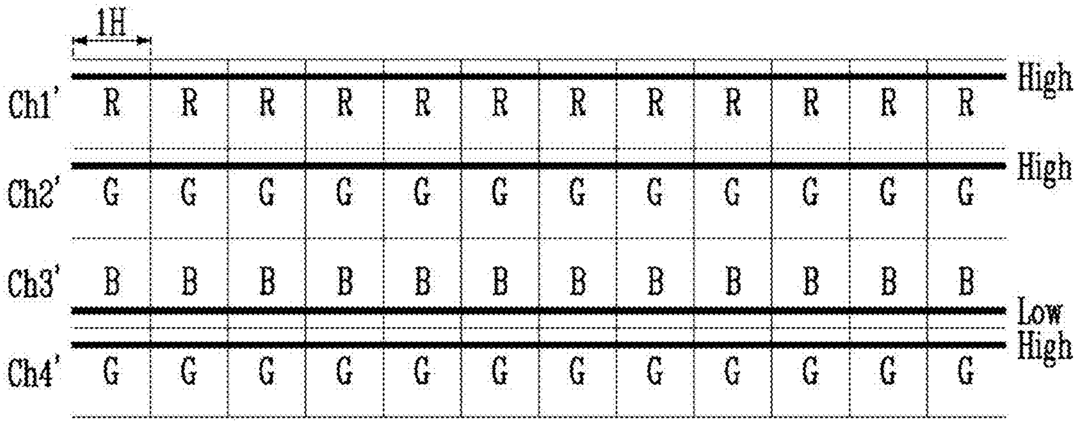

FIGS. 4A and 4B are schematic views for describing a modification of an anode connection structure of some sub-pixels in the PENTILE pixel structure. FIGS. 5A to 5C are diagrams for describing data signals to be provided to the respective source channels in accordance with an embodiment illustrated in FIG. 4B.

Referring to FIG. 4A, the display device 1 (refer to FIG. 1) may include a data driver 12 configured to supply data signals to respective data lines DL1' to DL5', and a display panel 15 including a plurality of sub-pixels PXij configured to emit red light (R), green light (G), and blue light (B).

In the display panel 15, the sub-pixels PXij configured to emit red light (R), green light (G), and blue light (B) may be arranged in a PENTILE pixel structure. In the PENTILE pixel structure in accordance with an embodiment, the sub-pixels PXij configured to emit red light (R) and the sub-pixels PXij configured to emit blue light (B) may be alternately connected to an identical data line (e.g., DL1', DL3', or DL5') in the extension direction of the data line DL1' to DL5', and the sub-pixels PXij configured to emit green light (G) may be successively connected to an identical data line (e.g., DL2' or DL4') in the extension direction of the data line DL1' to DL5'.

The data driver 12 may include a plurality of source channels Ch1' to Ch5'. The source channels Ch1' to Ch5' may be respectively connected to the data lines DL1' to DL5' in a one-to-one connection manner. The 2'-th and 4'-th source channels Ch2' and Ch4' each may be set to output only a data signal pertaining to one color. The 1'-th, 3'-th, and 5'-th source channels Ch1', Ch3', and Ch5' each may be set to alternately output data signals pertaining to two colors. For example, the 2'-th and 4'-th source channels Ch2' and Ch4' each may supply, during each one horizontal period, only a green data signal to the corresponding data line (e.g., DL2', DL4') to which the sub-pixels PXij configured to emit green light (G) are connected. The 1'-th, 3'-th, and 5'-th source channels Ch1', Ch3', and Ch5' each may alternately supply, during each one horizontal period, a red data signal and a blue data signal having different voltage levels to the corresponding data line (e.g., DL1', DL3', DL5') to which the sub-pixels PXij configured to emit red light (R) and the sub-pixels PXij configured to emit blue light (B) are connected.

Therefore, since the 1'-th, 3'-th, and 5'-th source channels Ch1', Ch3', and Ch5' each o alternately supply, during each one horizontal period, a red data signal and a blue data signal having different voltage levels to the corresponding data line (e.g., DL1', DL3', DL5') to which the sub-pixels PXij configured to emit red light (R) and the sub-pixels PXij configured to emit blue light (B) are connected, peak current may increase each time the voltage level of the data signal changes. Hence, power consumption may be increased.

To account for this, as illustrated in FIG. 4B, in an embodiment, not only each of the 2'-th and 4'-th source channels Ch2 and Ch4, but also each of the 1'-th, 3'-th, and 5'-th source channels Ch1, Ch3, and Ch5 may be set to output only a data signal pertaining to one color, by changing the anode connection structure of some sub-pixels.

In the display panel 15 illustrated in FIG. 4B, a plurality of sub-pixels PXij configured to emit red light (R), green light (G), and blue light (B) may be arranged in a PENTILE pixel structure, in the same manner as that of the embodiment illustrated in FIG. 4A.

The 11-th sub-pixel PX11, the 12-th sub-pixel PX12, the 13-th sub-pixel PX13, the 14-th sub-pixel PX14, and the 15-th sub-pixel PX15 that are disposed on the first pixel row may be connected to the first scan line SL1. The 21-th sub-pixel PX21, the 22-th sub-pixel PX22, the 23-th sub-pixel PX23, the 24-th sub-pixel PX24, and the 25-th sub-pixel PX25 that are disposed on the second pixel row may be connected to the second scan line SL2. The 31-th sub-pixel PX31, the 32-th sub-pixel PX32, the 33-th sub-pixel PX33, the 34-th sub-pixel PX34, and the 35-th sub-pixel PX35 that are disposed on the third pixel row may be connected to the third scan line SL3. The 41-th sub-pixel PX41, the 42-th sub-pixel PX42, the 43-th sub-pixel PX43, the 44-th sub-pixel PX44, and the 45-th sub-pixel PX45 that are disposed on the fourth pixel row may be connected to the fourth scan line SL4. Data signals may be supplied from the data driver 12 to the data lines DL1' to DL5' in synchronization with scan signals that are successively supplied to the scan lines SL1 to SL6.

The data driver 12 may include a plurality of source channels Ch1' to Ch5'. The source channels Ch1' to Ch5' may be respectively connected to the data lines DL1' to DL5' in a one-to-one connection manner. The source channels Ch1' to Ch5' each may be set to output only a data signal pertaining to one color.

In accordance with an embodiment, the 1'-th source channel Ch1' connected to the 1'-th data line DL1' may provide a data signal pertaining to a first color. The 2'-th source channel Ch2' connected to the 2'-th data line DL2' may provide a data signal pertaining to a second color. The 3'-th source channel Ch3' connected to the 3'-th data line DL3' may provide a data signal pertaining to a third color. The 4'-th source channel Ch4' connected to the 4'-th data line DL4' may provide a data signal pertaining to the second color. The 5'-th source channel Ch5' connected to the 5'-th data line DL5' may provide a data signal pertaining to the first color. Here, the first color may be red (R), the second color may be green (G), and the third color may be blue (B). Alternatively, the first color may be blue (B), the second color may be green (G), and the third color may be red (R). The sub-pixels PXij each may be formed of a light emitting element LD (refer to FIG. 3) configured to emit light of a color corresponding to a data signal supplied from a connected one of the data lines DL1' to DL5'.

For example, the 1'-th source channel Ch1' may be connected to the 1'-th data line DL1'. The 1'-th source channel Ch1' may output a red data signal to be supplied to the sub-pixels PXij configured to emit red light (R). To this end, the 1'-th data line DL1' may be connected to the 11-th sub-pixel PX11 and the 31-th sub-pixel PX31 of the first pixel column PXC1.

The 2'-th source channel Ch2' may be connected to the 2'-th data line DL2'. The 2'-th source channel Ch2' may output a green data signal to be supplied to the sub-pixels PXij configured to emit green light (G). To this end, the 2'-th data line DL2' may include the 12-th sub-pixel PX12, the 22-th sub-pixel PX22, the 32-th sub-pixel PX32, and the 42-th sub-pixel PX42 of the second pixel column PXC2. For example, an anode AE3 of the 22-th sub-pixel PX22 may be electrically connected to the second data line DL2 through a contact hole CNT3.

The 3'-th source channel Ch3' may be connected to the 3'-th data line DL3'. The 3'-th source channel Ch3' may output a blue data signal to be supplied to the sub-pixels PXij configured to emit blue light (B). To this end, the 3'-th data line DL3' may be connected to the 13-th sub-pixel PX13 and the 33-th sub-pixel PX33 of the third pixel column PXC3, and may be electrically connected to the 21-th sub-pixel PX21 and the 41-th sub-pixel PX41 of the first pixel column PXC1, rather than being connected to the 23-th sub-pixel PX23 and the 43-th sub-pixel PX43 of the third pixel column PXC3. For example, an anode AE11 of the light emitting element LD (refer to FIG. 3) included in the 33-th sub-pixel PX33 may be electrically connected to the 3'-th data line DL3' through a contact hole CNT11. An anode AE12 of the light emitting element LD (refer to FIG. 3) included in the 41-th sub-pixel PX41 may be electrically connected to the 3'-th data line DL3' through a contact hole CNT12. A connection relationship between the sub-pixels (e.g., PX21 and PX41) and the 3'-th data line DL3' will be described in detail with reference to FIG. 6.

The 4'-th source channel Ch4' may be connected to the 4'-th data line DL4'. The 4'-th source channel Ch4' may output a green data signal to be supplied to the sub-pixels PXij configured to emit green light (G). To this end, the 4'-th data line DL4' may include the 14-th sub-pixel PX14, the 24-th sub-pixel PX24, the 34-th sub-pixel PX34, and the 44-th sub-pixel PX44 of the fourth pixel column PXC4.

The 5'-th source channel Ch5' may be connected to the 5'-th data line DL5'. The 5'-th source channel Ch5' may output a red data signal to be supplied to the sub-pixels PXij configured to emit red light (R). To this end, the 5'-th data line DL5' may be connected to the 15-th sub-pixel PX15 and the 35-th sub-pixel PX35 of the fifth pixel column PXC5, and may be connected to the 23-th sub-pixel PX23 and the 43-th sub-pixel PX43 of the third pixel column PXC3 through a second contact hole VIA2, rather than being connected to the 25-th sub-pixel PX25 and the 45-th sub-pixel PX45 of the fifth pixel column PXC5. For example, an anode AE21 of the light emitting element LD (refer to FIG. 3) included in the 35-th sub-pixel PX35 may be electrically connected to the 5'-th data line DL5' through a contact hole CNT21. An anode AE22 of the light emitting element LD (refer to FIG. 3) included in the 43-th sub-pixel PX43 may be electrically connected to the 5'-th data line DL5' through a contact hole CNT22. A connection relationship between the sub-pixels (e.g., PX35 and PX43) and the 5'-th data line DL5' will be described in detail with reference to FIG. 6.

According to embodiments, the 5'-th source channels Ch5' and the other source channels may have a structure provided by repeatedly forming the 1'-th to 4'-th source channels Ch1' to Ch4'.

Hereinafter, effects of an embodiment illustrated in FIG. 4B will be described with reference to FIGS. 5A to 5C. Here, for convenience of explanation, a pattern expressed on the display panel 15 will be described using an embodiment in which any one of a red pattern (R), a green pattern (G), and a blue pattern (B) of the maximum grayscale (e.g., grayscale 255) is expressed on the entirety of a screen.

Referring to FIG. 5A, in the display device 1 in accordance with an embodiment illustrated in FIG. 4B, to express a red pattern (R) of grayscale 255 on the display panel 15, the 1'-th source channel Ch1' may supply a red data signal corresponding to grayscale 255 to the 1'-th data line DL1' during each one horizontal period 1H. In addition, the 2'-th and 4'-th source channels Ch2' and Ch4' may respectively supply green data signals corresponding to grayscale 0 to the 2'-th and 4'-th data lines DL2' and DL4' during each one horizontal period 1H. Furthermore, the 3'-th source channel Ch3' may supply a blue data signal corresponding to grayscale 0 to the 3'-th data line DL3' during each one horizontal period 1H.

Referring to FIG. 5B, in the display device 1 in accordance with an embodiment illustrated in FIG. 4B, to express a green pattern (G) of grayscale 255 on the display panel 15, the 1'-th source channel Ch1' may supply a red data signal corresponding to grayscale 0 to the 1'-th data line DL1' during each one horizontal period 1H. In addition, the 2'-th and 4'-th source channels Ch2' and Ch4' may respectively supply green data signals corresponding to grayscale 255 to the 2'-th and 4'-th data lines DL2' and DL4' during each one horizontal period 1H. Furthermore, the 3'-th source channel Ch3' may supply a blue data signal corresponding to grayscale 0 to the 3'-th data line DL3' during each one horizontal period 1H.

Referring to FIG. 5C, in the display device 1 in accordance with an embodiment illustrated in FIG. 4B, to express a blue pattern (B) of grayscale 255 on the display panel 15, the 1'-th source channel Ch1' may supply a red data signal corresponding to grayscale 0 to the 1'-th data line DL1' during each one horizontal period 1H. In addition, the 2'-th and 4'-th source channels Ch2' and Ch4' may respectively supply green data signals corresponding to grayscale 0 to the 2'-th and 4'-th data lines DL2' and DL4' during each one horizontal period 1H. Furthermore, the 3'-th source channel Ch3' may supply a blue data signal corresponding to grayscale 255 to the 3'-th data line DL3' during each one horizontal period 1H.

As such, in an embodiment according to FIG. 4B, to express the red pattern (R) on the display panel 15, the 1'-th source channel Ch1' may supply, during each one horizontal period 1H, only a red data signal having an identical voltage level (e.g., a logic low level) to the 1'-th data line DL1' to which only the sub-pixels PXij configured to emit red light (R) are connected. To express the blue pattern (B) on the display panel 15, the 3'-th source channel Ch3' may supply, during each one horizontal period 1H, only a blue data signal having an identical voltage level (e.g., a logic low level) to the 3'-th data line DL3' to which only the sub-pixels PXij configured to emit blue light (B) are connected. Hence, an increase in power consumption due to toggling may be minimized or reduced, compared to that of in the configuration illustrated in FIG. 4A in which, to express a red pattern (R) on the display panel 15, a red data signal (e.g., a logic low level) corresponding to grayscale 255 and a blue data signal (e.g., a logic high level) corresponding to grayscale 0 are alternately supplied during each one horizontal period 1H, and to express a blue pattern (B) on the display panel 15, a blue data signal (e.g., a logic low level) corresponding to grayscale 255 and a red data signal (e.g., a logic high level) corresponding to grayscale 0 are alternately supplied during each one horizontal period 1H.

Figure 6:
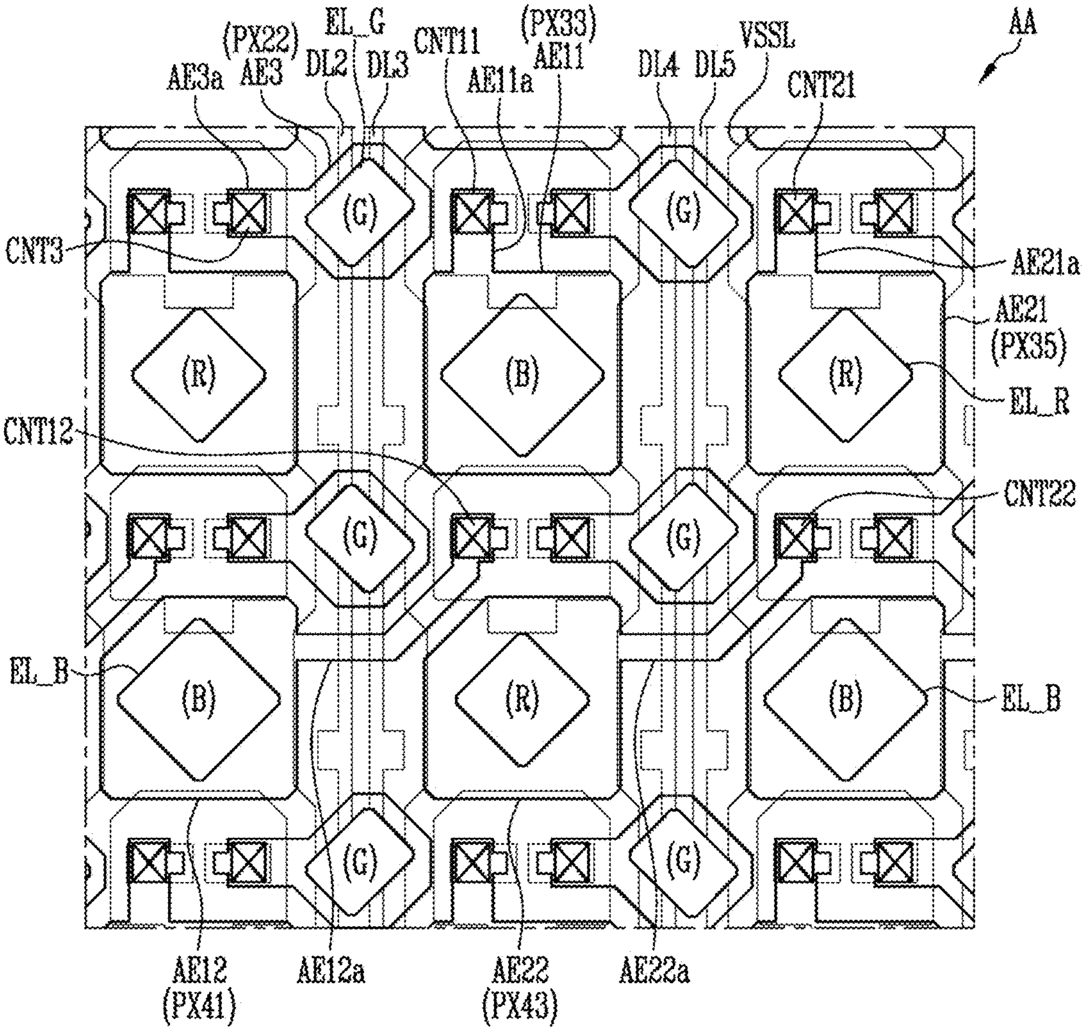
FIG. 6 is a layout diagram of a pixel circuit in area AA of FIG. 4B in accordance with an embodiment.

FIG. 6 is a layout diagram of a pixel circuit in area AA of FIG. 4B in accordance with an embodiment.

Referring to FIGS. 3, 4B, and 6, the sub-pixels PXij configured to emit red light (R), green light (G), and blue light (B) each may include an emission layer EL which may emit a corresponding one of the red light (R), the green light (G), and the blue light (B). The shape of each sub-pixel PXij may be determined depending on the shape of the emission layer EL that may emit color light through an opening such as a black matrix. Although FIG. 6 illustrates that the sub-pixel PXij has a rhombus shape, embodiments of the present disclosure are not limited thereto. For example, according to embodiments, the shape of the sub-pixel PXij may have an elliptical shape, an octagonal shape, etc.

The emission layer EL of each of the sub-pixels PXij may be driven by a pixel circuit PXC to which an anode AE of the corresponding sub-pixel PXij is connected through a contact hole CNT. The respective pixel circuits PXC of the sub-pixels PXij may be disposed in parallel lines (e.g., in the vertical direction in FIG. 6) by colors in the extension direction of the data lines DL. The anode AE of each of the sub-pixels PXij configured to emit red light (R) or blue light (B) may be disposed to at least partially overlap the pixel circuit PXC of the corresponding sub-pixel PXij in a thickness direction (for example, AE11 or AE21), or may be disposed to at least partially overlap one of other pixel circuits PXC other than the pixel circuit PXC of the corresponding sub-pixel PXij in the thickness direction (for example, AE12 or AE22).

For example, the 33-th sub-pixel PX33 of the third pixel column PXC3 may include an emission layer EL_B configured to emit blue light (B), and an 11-th anode AE11 may be connected, through an 11-th contact hole CNT11, to the pixel circuit PXC (e.g., the second electrode of the sixth transistor T6) of the 33-th sub-pixel PX33 that is formed on the third pixel column PXC3. The 41-th sub-pixel PX41 of the first pixel column PXC1 may include an emission layer EL_B configured to emit blue light (B), and a 12-th anode AE12 may be connected, through a 12-th contact hole CNT12, to the pixel circuit PXC (e.g., the second electrode of the sixth transistor T6) of the 41-th sub-pixel PX41 that is formed on the third pixel column PXC3. For example, the 12-th anode AE12 may be disposed to at least partially overlap, in the thickness direction, one of other pixel circuits PXC that overlap the first pixel column PXC1.

The 35-th sub-pixel PX35 of the fifth pixel column PXC5 may include an emission layer EL_R configured to emit red light (R), and a 21-th anode AE21 may be connected, through a 21-th contact hole CNT21, to the pixel circuit PXC (e.g., the second electrode of the sixth transistor T6) of the 35-th sub-pixel PX35 that is formed on the fifth pixel column PXC5. The 43-th sub-pixel PX43 of the third pixel column PXC3 may include an emission layer EL_R configured to emit red light (R), and a 22-th anode AE22 may be connected, through a 22-th contact hole CNT22, to the pixel circuit PXC (e.g., the second electrode of the sixth transistor T6) of the 43-th sub-pixel PX43 that is formed on the fifth pixel column PXC5. For example, the 22-th anode AE22 may be disposed to at least partially overlap, in the thickness direction, one of other pixel circuits PXC that overlap the third pixel column PXC3.

The 22-th sub-pixel PX22 of the second pixel column PXC2 may include an emission layer EL_G configured to emit green light (G), and a 3-th anode AE3 may be connected, through a third contact hole CNT3, to the pixel circuit PXC (e.g., the second electrode of the sixth transistor T6) of the 22-th sub-pixel PX22 that is formed on the second pixel column PXC2.

Therefore, the anodes of the sub-pixels PXij configured to emit red light (R) or blue light (B) may be different in surface area and/or length from each other by even-number-th pixel rows and odd-number-th pixel rows. The anodes of the sub-pixels PXij configured to emit green light (G) may be the same in surface area and/or length on all of the pixel rows.

In an embodiment illustrated in FIG. 6, the anode AE11 or AE21 of each of the sub-pixels PX33 or PX35 that are disposed on an odd-number-th pixel row and configured to emit red light (R) or blue light (B) may have a substantially rectangular body, and include a first connector AE11*a* or AE21*a* extending from the rectangular body to the corresponding contact hole CNT. The anode AE12 or AE22 of each of the sub-pixels PX41 or PX43 that are disposed on an even-number-th pixel row and configured to emit red light (R) or blue light (B) may have a rectangular body with one chamfered corner, and include a second connector AE12*a* or AE22*a* extending from the rectangular body to the corresponding contact hole CNT. Here, a surface area of the anode of each of the sub-pixels PX41 or PX43 that are disposed on the even-number-th pixel row and configured to emit red light (R) or blue light (B) may be greater than that of the anode of each of the sub-pixels PX33 or PX35 that are disposed on the odd-number-th pixel row and configured to emit red light (R) or blue light (B). Furthermore, a length between opposite ends of the second connector AE12*a* or AE22*a* may be greater than a length between opposite ends of the first connector AE11*a* or AE21*a*.

The respective anodes of the sub-pixels PX22 configured to emit green light (G) may have substantially the same octagonal body on all of the pixel rows, and each may include a connector AE3*a* extending from the octagonal body to the corresponding contact hole CNT.

Figure 8:
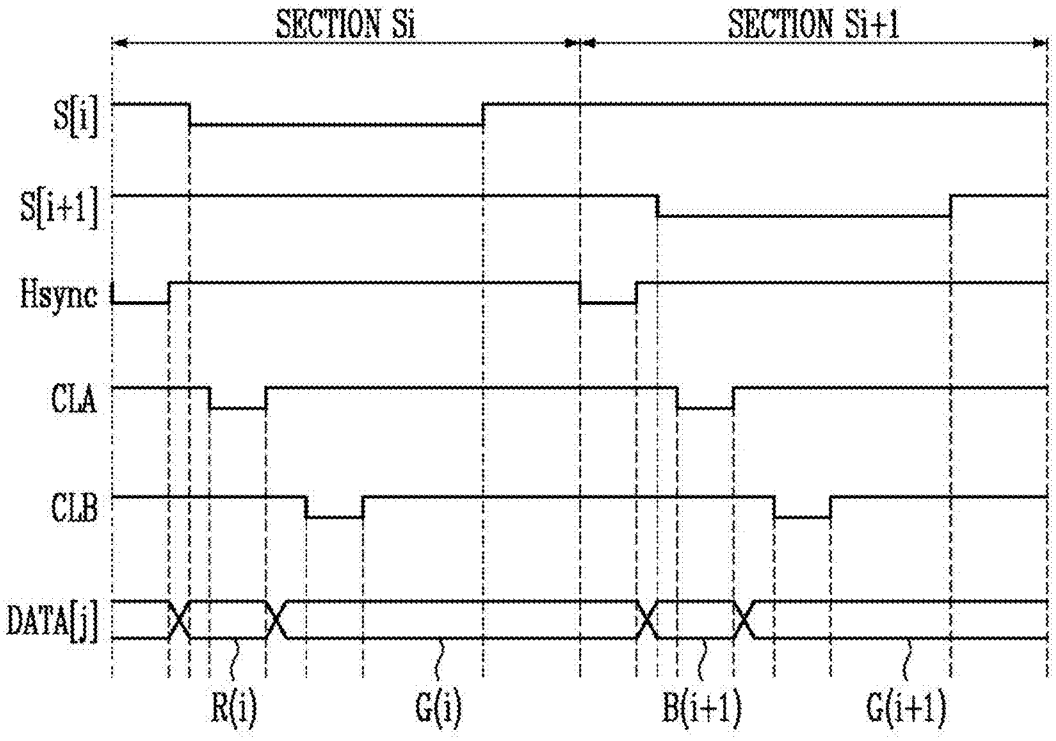
FIG. 8 is a signal diagram for describing a method of driving the display device illustrated in FIG. 7 in accordance with an embodiment.
Figure 9A:
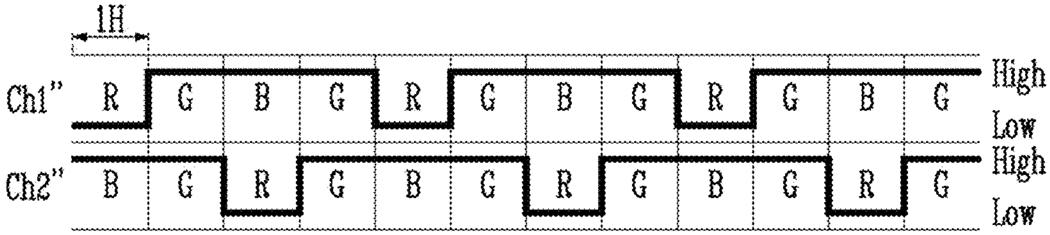
FIGS. 9A to 9C are diagrams for describing data signals to be provided to the respective source channels in accordance with an embodiment illustrated in FIG. 7.
Figure 9B:
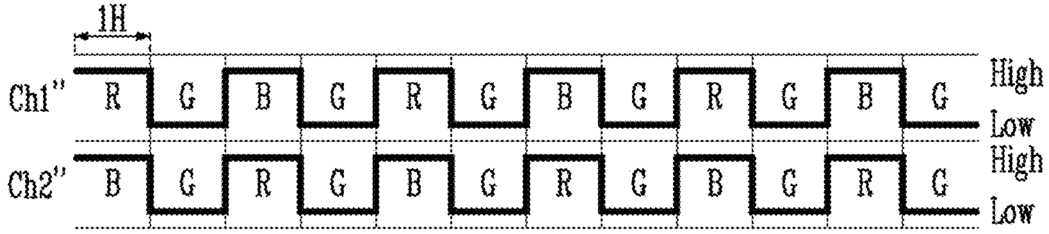
Figure 9C:
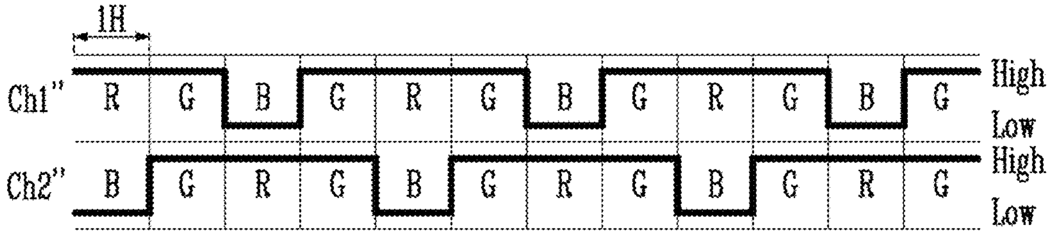

FIG. 7 is a schematic diagram for describing an embodiment in which a demultiplexer 13 is added to the display device including the PENTILE pixel structure of FIG. 4A. FIG. 8 is a signal diagram for describing a method of driving the display device illustrated in FIG. 7 in accordance with an embodiment. FIGS. 9A to 9C are diagrams for describing data signals to be provided to the respective source channels in accordance with an embodiment illustrated in FIG. 7.

An embodiment as illustrated in FIG. 7 differs from an embodiment as illustrated in FIG. 4A in that the demultiplexer 13 is further included between the data driver 12 and the display panel 15. The other components are substantially the same as those described with reference to FIG. 4A, and for convenience of explanation, a redundant explanation thereof will be omitted, and the following description will focus on the demultiplexer 13.

Referring to FIGS. 1 and 7, the demultiplexer 13 may include a plurality of first select transistors MA1, MA2, MA3, . . . , and a plurality of second select transistors MB1, MB2, . . . which may be turned on or off depending on a fourth driving control signal DMCS.

The demultiplexer 13 may generate, based on the fourth driving control signal DMCS, a first select signal CLA for controlling the plurality of first select transistors MA1, MA2, MA3, . . . , and a second select signal CLB for controlling the plurality of second select transistors MB1, MB2, . . . . In an embodiment, the first select signal CLA and the second select signal CLB may be included in the fourth driving control signal DMCS.

Each of the plurality of first select transistors MA1, MA2, MA3, . . . may include a gate electrode to which the first select signal CLA is to be applied, a first electrode connected to a corresponding data line DL1", DL2", DL3", . . . , and a second electrode connected to a corresponding first sub-data line DA1, DA2, DA3, . . . .

Each of the plurality of second select transistors MB1, MB2, . . . may include a gate electrode to which the second select signal CLB is to be applied, a first electrode connected to a corresponding data line DL1", DL2", DL3", . . . , and a second electrode connected to a corresponding second sub-data line DB1, DB2, . . . .

A plurality of sub-pixels PXij configured to emit red light (R) and a plurality of sub-pixels PXij configured to emit blue light (B) may be alternately connected to each of the first sub-data lines DA1, DA2, DA3, . . . . A plurality of sub-pixels PXij configured to emit green light (G) may be connected to each of the second sub-data lines DB1, DB2, . . . .

The plurality of first select transistors MA1, MA2, MA3, . . . and the plurality of second select transistors MB1, MB2, . . . each may be, for example, a PMOS transistor. A gate-on voltage of the PMOS transistor may be a low level voltage, and a gate-off voltage thereof may be a high level voltage.

However, embodiments of the present disclosure are not limited thereto. For example, at least one of the plurality of first select transistors MA1, MA2, MA3, . . . and the plurality of second select transistors MB1, MB2, . . . may be an NMOS transistor. A gate-on voltage of the NMOS transistor may be a high level voltage, and a gate-off voltage thereof may be a low level voltage.

The first select signal CLA and the second select signal CLB may be successively applied at a gate-on voltage, on a scan line basis. For example, the first select signal CLA may be applied at a gate-on voltage and then changed to a gate-off voltage, and thereafter the second select signal CLB may be applied at a gate-on voltage.

While the first select signal CLA is applied at a gate-on voltage, the data driver 12 may apply, to the plurality of data lines DL1", DL2", DL3", . . . , any one of a first color data signal corresponding to the sub-pixels PXij configured to emit red light (R) and a third color data signal corresponding to the sub-pixels PXij configured to emit blue light (B). While the second select signal CLB is applied at a gate-on voltage, the data driver 12 may apply, to the data lines DL1", DL2", DL3", . . . , a second color data signal corresponding to the sub-pixels PXij configured to emit green light (G).

Each of a plurality of source channels Ch1", Ch2", Ch3", . . . may supply all of the first color data signal corresponding to the sub-pixels PXij configured to emit red light (R), the second color data signal corresponding to the sub-pixels PXij configured to emit green light (G), and the third color data signal corresponding to the sub-pixels PXij configured to emit blue light (B). For example, each of the 1"-th source channel Ch1" and the 3"-th source channel Ch3" may supply data signals in a sequence of the first color data signal, the second color data signal, the third color data signal, and the second color data signal. The 2"-th source channel Ch2" may supply data signals in a sequence of the third color data signal, the second color data signal, the first color data signal, and the second color data signal.

Referring to FIGS. 7 and 8, for convenience of explanation, FIG. 8 illustrates section Si in which a data signal corresponding to an i-th scan line SLi is applied, and section Si+1 in which a data signal corresponding to an i+1-th scan line SLi+1 is applied (where i is a natural number). Furthermore, FIG. 8 illustrates a data signal DATA [j] to be applied to a j-th data line DLj (where j is a natural number).

In synchronization with a horizontal synchronization signal Hsync, the first select signal CLA and the second select signal CLB may be successively applied at a gate-on voltage. A section in which the first select signal CLA and the second select signal CLB are applied at a gate-on voltage may be included in a section in which the scan signals S[i] and S[i+1] are applied at a gate-on voltage.

In section Si, the data signal DATA[j] may be applied as a first color data signal (e.g., R(i)) corresponding to the i-th scan line SLi in response to the first select signal CLA having a gate-on voltage. The first select transistor MAj may be turned on by the first select signal CLA having a gate-on voltage. As a result, the first color data signal (e.g., R(i)) may be applied to a first sub-data line DAj through the turned-on first select transistor MAj.

Subsequently, the data signal DATA[j] may be applied as a second color data signal (e.g., G(i)) corresponding to the i-th scan line SLi in response to the second select signal CLB having a gate-on voltage. The second select transistor MBj may be turned on by the second select signal CLB having a gate-on voltage. As a result, the second color data signal (e.g., G(i)) may be applied to a second sub-data line DBj through the turned-on second select transistor MBj.

In section Si+1, the data signal DATA[j] may be applied as a third color data signal (e.g., B(i+1)) corresponding to the i+1-th scan line SLi+1 in response to the first select signal CLA having a gate-on voltage. The first select transistor MAj may be turned on by the first select signal CLA having a gate-on voltage, so that the third color data signal (e.g., B(i+1)) may be applied to the first sub-data line DAj through the turned-on first select transistor MAj.

Subsequently, the data signal DATA[j] may be applied as a second color data signal (e.g., G(i+1)) corresponding to the i+1-th scan line SLi+1 in response to the second select signal CLB having a gate-on voltage. The second select transistor MBj may be turned on by the second select signal CLB having a gate-on voltage. As a result, the second color data signal (e.g., G(i+1)) may be applied to the second sub-data line DBj through the turned-on second select transistor MBj.

Data signals to be supplied to the respective source channels will be described in detail with reference to FIGS. 9A to 9C. Here, for convenience of explanation, a pattern expressed on the display panel 15 will be described using an embodiment in which any one of a red pattern (R), a green pattern (G), and a blue pattern (B) having the maximum grayscale (e.g., grayscale 255) is expressed on the entirety of a screen.

Referring to FIGS. 7 and 9A, in the display device 1 in accordance with an embodiment illustrated in FIG. 7, to express a red pattern (R) of grayscale 255 on the display panel 15, the 1"-th source channel Ch1" and the 2"-th source channel Ch2" each may supply a red data signal corresponding to grayscale 255 to the first sub-data line DAj during each two horizontal period 2H, may supply a green data signal corresponding to grayscale 0 to the second sub-data line DBj during each two horizontal period 2H, and may supply a blue data signal corresponding to grayscale 0 to the first sub-data line DAj during each two horizontal period 2H.

Referring to FIGS. 7 and 9B, in the display device 1 in accordance with an embodiment illustrated in FIG. 7, to express a green pattern (G) of grayscale 255 on the display panel 15, the 1"-th source channel Ch1" and the 2"-th source channel Ch2" each may supply a green data signal corresponding to grayscale 255 to the second sub-data line DBj during each one horizontal period 1H, may supply a red data signal corresponding to grayscale 0 to the first sub-data line DAj during each two horizontal period 2H, and may supply a blue data signal corresponding to grayscale 0 to the first sub-data line DAj during each two horizontal period 2H.

Referring to FIGS. 7 and 9C, in the display device 1 in accordance with an embodiment illustrated in FIG. 7, to express a blue pattern (B) of grayscale 255 on the display panel 15, the 1"-th source channel Ch1" and the 2"-th source channel Ch2" each may supply a blue data signal corresponding to grayscale 255 to the first sub-data line DAj during each two horizontal period 2H, may supply a green data signal corresponding to grayscale 0 to the second sub-data line DBj during each one horizontal period 1H, and may supply a red data signal corresponding to grayscale 0 to the first sub-data line DAj during each two horizontal period 2H.

Figure 10:
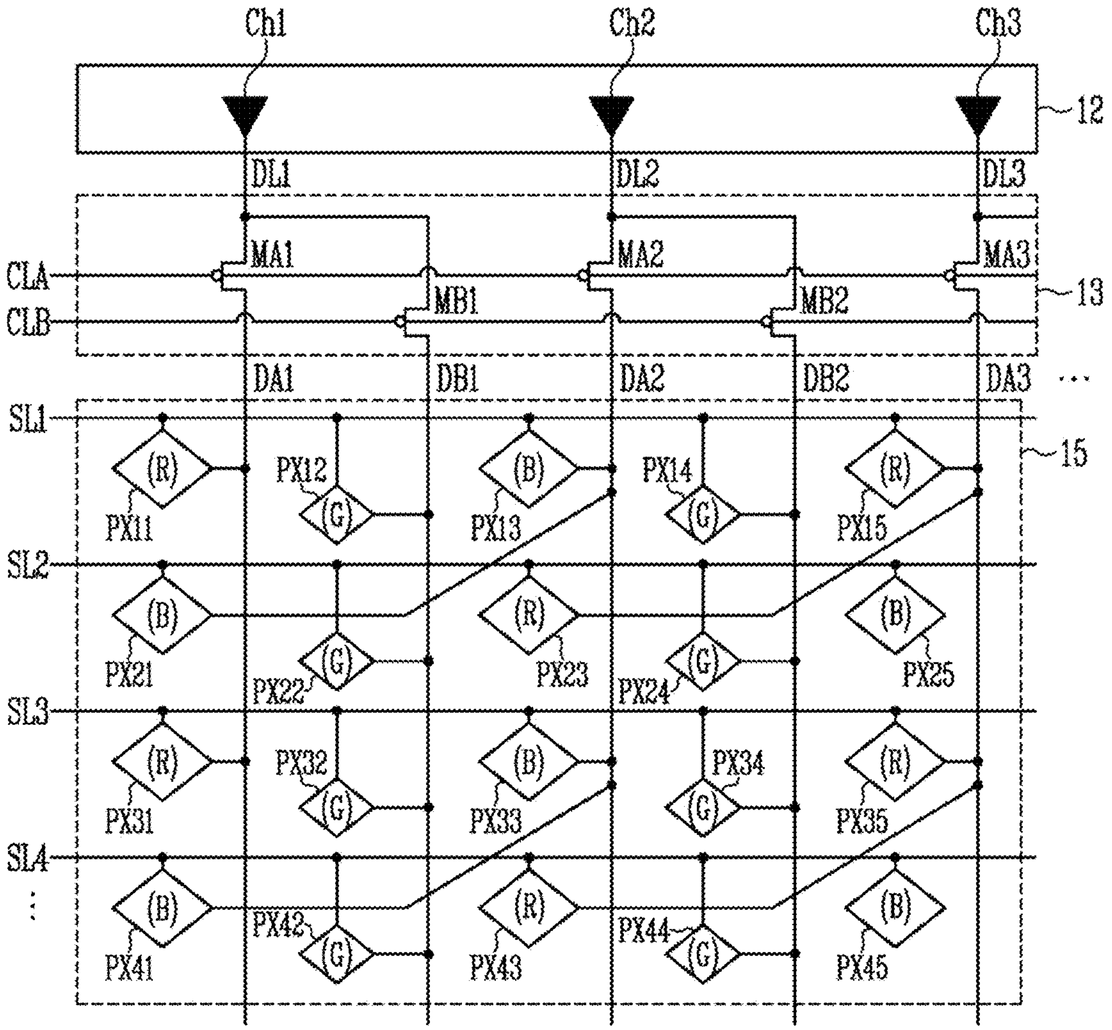
FIG. 10 is a schematic diagram for describing an embodiment in which a demultiplexer is added to the display device including the PENTILE pixel structure of FIG. 4B.
Figure 11:
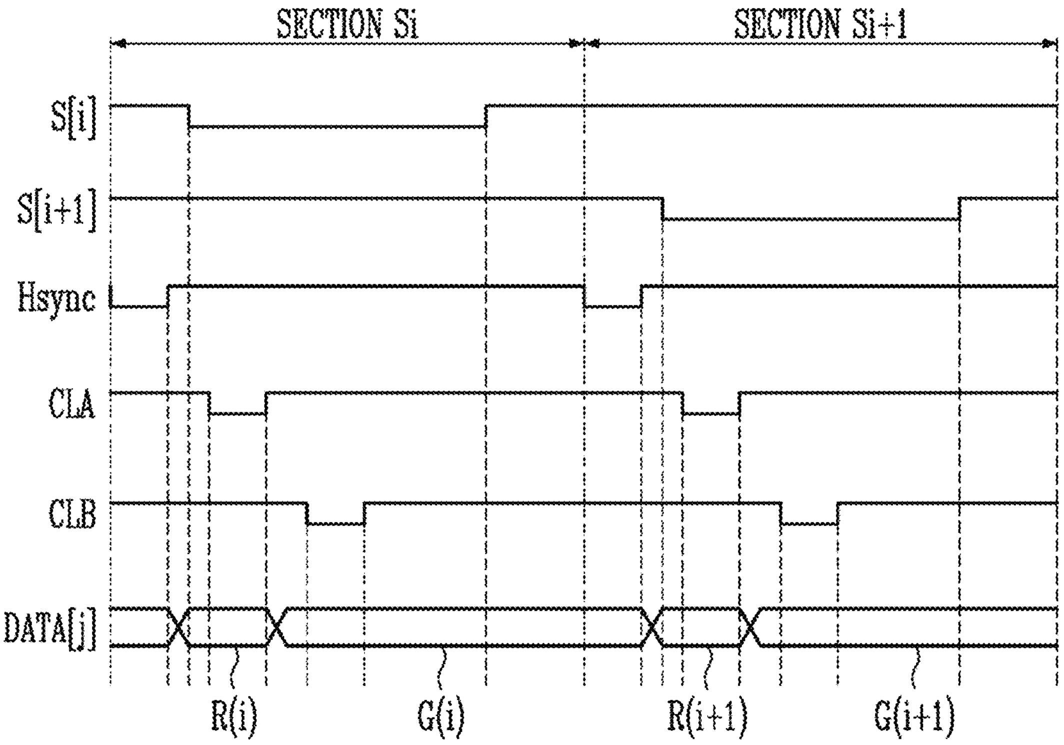
FIG. 11 is a signal diagram for describing a method of driving the display device illustrated in FIG. 10.
Figure 12A:
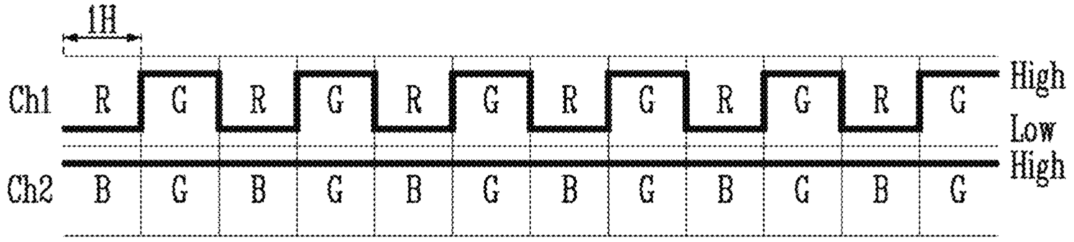
FIGS. 12A to 12C are diagrams for describing data signals to be provided to the respective source channels in accordance with the embodiment illustrated in FIG. 10.
Figure 12B:
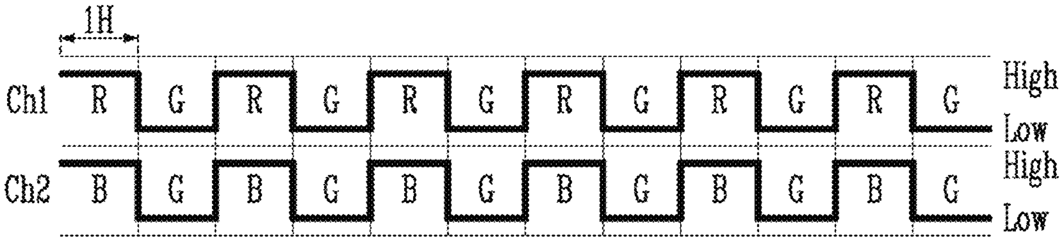
Figure 12C:
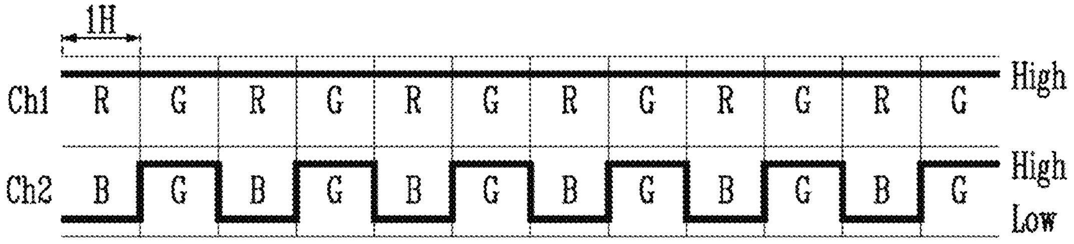

FIG. 10 is a schematic diagram for describing an embodiment in which a demultiplexer is added to the display device including the PENTILE pixel structure of FIG. 4B. FIG. 11 is a signal diagram for describing a method of driving the display device illustrated in FIG. 10 in accordance with an embodiment. FIGS. 12A to 12C are diagrams for describing data signals to be provided to the respective source channels in accordance with an embodiment illustrated in FIG. 10.

Referring to FIGS. 1 and 10, the demultiplexer 13 may include a plurality of first select transistors MA1, MA2, MA3, . . . , and a plurality of second select transistors MB1, MB2, . . . which may be turned on or off depending on a fourth driving control signal DMCS.

The demultiplexer 13 may generate, based on the fourth driving control signal DMCS, a first select signal CLA for controlling the plurality of first select transistors MA1, MA2, MA3, . . . , and a second select signal CLB for controlling the plurality of second select transistors MB1, MB2, . . . . In an embodiment, the first select signal CLA and the second select signal CLB may be included in the fourth driving control signal DMCS.

Each of the plurality of first select transistors MA1, MA2, MA3, . . . may include a gate electrode to which the first select signal CLA is to be applied, a first electrode connected to a corresponding data line DL1, DL2, DL3, . . . , and a second electrode connected to a corresponding first sub-data line DA1, DA2, DA3, . . . .

Each of the plurality of second select transistors MB1, MB2, . . . may include a gate electrode to which the second select signal CLB is to be applied, a first electrode connected to a corresponding data line DL1, DL2, DL3, . . . , and a second electrode connected to a corresponding second sub-data line DB1, DB2, . . . .

The first sub-data lines DA1, DA2, DA3, . . . may include 1-1-th sub-data lines DA1, DA3, . . . to which a plurality of sub-pixels PXij configured to emit red light (R) are connected, and 1-2-th sub-data lines DA2, . . . to which a plurality of sub-pixels PXij configured to emit blue light (B) are connected. The 1-1-th sub-data lines DA1, DA3, . . . may be supplied with only the first color data signal. The 1-2-th sub-data lines DA2, . . . may be supplied with only the third color data signal.

Furthermore, a plurality of sub-pixels PXij configured to emit green light (G) may be connected to the second sub-data lines DB1, DB2, . . . . For example, the second sub-data lines DB1, DB2, . . . may include a 2-1-th sub-data line DB1 to which second color pixels disposed on the second pixel column PXC2 are connected, and a 2-2-th sub-data line DB2 to which second color pixels disposed on the fourth pixel column PXC4 are connected. The 2-1-th sub-data line DB1 and the 2-2-th sub-data line DB2 each may be supplied with only the second color data signal.

The plurality of first select transistors MA1, MA2, MA3, . . . and the plurality of second select transistors MB1, MB2, . . . each may be a PMOS transistor. A gate-on voltage of the PMOS transistor may be a low level voltage, and a gate-off voltage thereof may be a high level voltage. However, embodiments of the present disclosure are not limited thereto. For example, at least one of the plurality of first select transistors MA1, MA2, MA3, . . . and the plurality of second select transistors MB1, MB2, . . . may be an NMOS transistor. A gate-on voltage of the NMOS transistor may be a high level voltage, and a gate-off voltage thereof may be a low level voltage.

The first select signal CLA and the second select signal CLB may be successively applied at a gate-on voltage, on a scan line basis. For example, the first select signal CLA may be applied at a gate-on voltage and then changed to a gate-off voltage, and thereafter the second select signal CLB may be applied at a gate-on voltage.

While the first select signal CLA is applied at a gate-on voltage, the data driver 12 may apply, to the plurality of data lines DL1, DL2, DL3, . . . , any one of a first color data signal corresponding to the sub-pixels PXij configured to emit red light (R) and a third color data signal corresponding to the sub-pixels PXij configured to emit blue light (B). While the second select signal CLB is applied at a gate-on voltage, the data driver 12 may apply, to the data lines DL1, DL2, DL3, . . . , a second color data signal corresponding to the sub-pixels PXij configured to emit green light (G).

The odd-number-th source channels Ch1, Ch3, . . . of the plurality of source channels Ch1, Ch2, and Ch3, . . . each may alternately supply a first color data signal corresponding to the sub-pixels PXij configured to emit red light (R), and a second color data signal corresponding to the sub-pixels PXij configured to emit green light (G). The even-number-th source channels Ch2, . . . of the plurality of source channels Ch1, Ch2, and Ch3, . . . each may alternately supply a third color data signal corresponding to the sub-pixels PXij configured to emit blue light (B), and a second color data signal corresponding to the sub-pixels PXij configured to emit green light (G). For example, the first source channel Ch1 and the third source channel Ch3 each may supply data signals in a sequence of the first color data signal and the second color data signal. The second source channel Ch2 may supply data signals in a sequence of the third color data signal and the second color data signal.

The types of data signals to be supplied by each of the source channels Ch1, Ch2, Ch3, . . . are not limited thereto. For example, the odd-number-th source channels Ch1, Ch3, . . . each may alternately supply a third color data signal corresponding to the sub-pixels PXij configured to emit blue light (B), and a second color data signal corresponding to the sub-pixels PXij configured to emit green light (G). The even-number-th source channels Ch2, . . . of the plurality of source channels Ch1, Ch2, and Ch3, . . . each may alternately supply a first color data signal corresponding to the sub-pixels PXij configured to emit red light (R), and a second color data signal corresponding to the sub-pixels PXij configured to emit green light (G).

Referring to FIGS. 10 and 11, for convenience of explanation, FIG. 11 illustrates section Si in which a data signal corresponding to an i-th scan line SLi is applied, and section Si+1 in which a data signal corresponding to an i+1-th scan line SLi+1 is applied (where i is a natural number). Furthermore, FIG. 11 illustrates a data signal DATA [j] to be applied to a j-th data line DLj (where j is a natural number). Hereinafter, embodiments will be described based on the assumption that the j-th data line DLj is an odd-number-th data line.

In synchronization with a horizontal synchronization signal Hsync, the first select signal CLA and the second select signal CLB may be successively applied at a gate-on voltage. A section in which the first select signal CLA and the second select signal CLB are applied at a gate-on voltage may be included in a section in which the scan signals S[i] and S[i+1] are applied at a gate-on voltage.

In section Si, the data signal DATA[j] may be applied as a first color data signal (e.g., R(i)) corresponding to the i-th scan line SLi in response to the first select signal CLA having a gate-on voltage. The first select transistor MAj may be turned on by the first select signal CLA having a gate-on voltage. As a result, the first color data signal (e.g., R(i)) may be applied to the first sub-data line DAj through the turned-on first select transistor MAj.

Subsequently, the data signal DATA[j] may be applied as a second color data signal (e.g., G(i)) corresponding to the i-th scan line SLi in response to the second select signal CLB having a gate-on voltage. The second select transistor MBj may be turned on by the second select signal CLB having a gate-on voltage. As a result, the second color data signal (e.g., G(i)) may be applied to the second sub-data line DBj through the turned-on second select transistor MBj.

In section Si+1, the data signal DATA[j] may be applied as a first color data signal (e.g., R(i+1)) corresponding to the i+1-th scan line SLi+1 in response to the first select signal CLA having a gate-on voltage. The first select transistor MAj may be turned on by the first select signal CLA having a gate-on voltage. As a result, the first color data signal (e.g., R(i+1)) may be applied to the first sub-data line DAj through the turned-on first select transistor MAj.

Subsequently, the data signal DATA[j] may be applied as a second color data signal (e.g., G(i+1)) corresponding to the i+1-th scan line SLi+1 in response to the second select signal CLB having a gate-on voltage. The second select transistor MBj may be turned on by the second select signal CLB having a gate-on voltage. As a result, the second color data signal (e.g., G(i+1)) may be applied to the second sub-data line DBj through the turned-on second select transistor MBj.

According to embodiments, in a case in which the j-th data line DLj corresponds to an even-number-th data line, in section Si, the data signal DATA[j] may be applied as a third color data signal (e.g., B(i)) corresponding to the i-th scan line SLi in response to the first select signal CLA having a gate-on voltage. The first select transistor MAj may be turned on by the first select signal CLA having a gate-on voltage. As a result, the third color data signal (e.g., B(i)) may be applied to the first sub-data line DAj through the turned-on first select transistor MAj.

Subsequently, the data signal DATA[j] may be applied as a second color data signal (e.g., G(i)) corresponding to the i-th scan line SLi in response to the second select signal CLB having a gate-on voltage. The second select transistor MBj may be turned on by the second select signal CLB having a gate-on voltage. As a result, the second color data signal (e.g., G(i)) may be applied to the second sub-data line DBj through the turned-on second select transistor MBj.

In section Si+1, the data signal DATA[j] may be applied as a third color data signal (e.g., B(i+1)) corresponding to the i+1-th scan line SLi+1 in response to the first select signal CLA having a gate-on voltage. The first select transistor MAj may be turned on by the first select signal CLA having a gate-on voltage. As a result, the third color data signal (e.g., B(i+1)) may be applied to the first sub-data line DAj through the turned-on first select transistor MAj.

Subsequently, the data signal DATA[j] may be applied as a second color data signal (e.g., G(i+1)) corresponding to the i+1-th scan line SLi+1 in response to the second select signal CLB having a gate-on voltage. The second select transistor MBj may be turned on by the second select signal CLB having a gate-on voltage. As a result, the second color data signal (e.g., G(i+1)) may be applied to the second sub-data line DBj through the turned-on second select transistor MBj.

Data signals to be supplied to the respective source channels will be described in detail with reference to FIGS. 12A to 12C. Here, for convenience of explanation, a pattern expressed on the display panel 15 will be described with reference to an embodiment in which any one of a red pattern (R), a green pattern (G), and a blue pattern (B)

having the maximum grayscale (e.g., grayscale 255) is expressed on the entirety of a screen.

Referring to FIGS. 10 and 12A, in the display device 1 in accordance with an embodiment illustrated in FIG. 10, to express a red pattern (R) of grayscale 255 on the display panel 15, the first source channel Ch1 may supply a red data signal corresponding to grayscale 255 to a 1-1-th sub-data line (e.g., DA1, DA3, . . . ) during each one horizontal period 1H, and supply a green data signal corresponding to grayscale 0 to a second sub-data line DBj during each one horizontal period 1H. The second source channel Ch2 may supply a blue data signal corresponding to grayscale 0 to a 1-2-th sub-data line (e.g., DA2, . . . ) during each one horizontal period 1H, and supply a green data signal corresponding to grayscale 0 to the second sub-data line DBj during each one horizontal period 1H.

Referring to FIGS. 10 and 12B, in the display device 1 in accordance with an embodiment illustrated in FIG. 10, to express a green pattern (G) of grayscale 255 on the display panel 15, the first source channel Ch1 may supply a green data signal corresponding to grayscale 255 to the second sub-data line DBj during each one horizontal period 1H, and supply a red data signal corresponding to grayscale 0 to the 1-1-th sub-data line (DA1, DA3, . . . ) during each one horizontal period 1H. To express the green pattern (G) of grayscale 255, the second source channel Ch2 may supply a green data signal corresponding to grayscale 255 to the second sub-data line DBj during each one horizontal period 1H, and supply a blue data signal corresponding to grayscale 0 to the 1-2-th sub-data line (e.g., DA2, . . . ) during each one horizontal period 1H.

Referring to FIGS. 10 and 12C, in the display device 1 in accordance with an embodiment illustrated in FIG. 10, to express a blue pattern (B) of grayscale 255 on the display panel 15, the first source channel Ch1 may supply a red data signal corresponding to grayscale 0 to the 1-1-th sub-data line (e.g., DA1, DA3, . . . ) during each one horizontal period 1H, and supply a green data signal corresponding to grayscale 0 to the second sub-data line DBj during each one horizontal period 1H. The second source channel Ch2 may supply a blue data signal corresponding to grayscale 255 to a 1-2-th sub-data line (e.g., DA2, . . . ) during each one horizontal period 1H, and supply a green data signal corresponding to grayscale 0 to the second sub-data line DBj during each one horizontal period 1H.

In accordance with an embodiment illustrated in FIG. 10, only a data signal pertaining to a single color may be provided to each of the 1-1-th sub-data line (e.g., DA1, DA3, . . . ), the 1-2-th sub-data line (e.g., DA2, . . . ), and the second sub-data line (e.g., DB1, DB2, . . . ). As a result, unnecessary charge/discharge operations which may occur in the case of an embodiment according to FIG. 7 where data signals pertaining to different colors are alternately provided may be reduced, and thus, power consumption can be reduced. Furthermore, since a data signal may be rapidly supplied to the display panel 15 through the demultiplexer 13, the display quality may be increased.

Hereinafter, for convenience of explanation, a further description of components and technical aspects previously described may be omitted or simplified.

Figure 13:
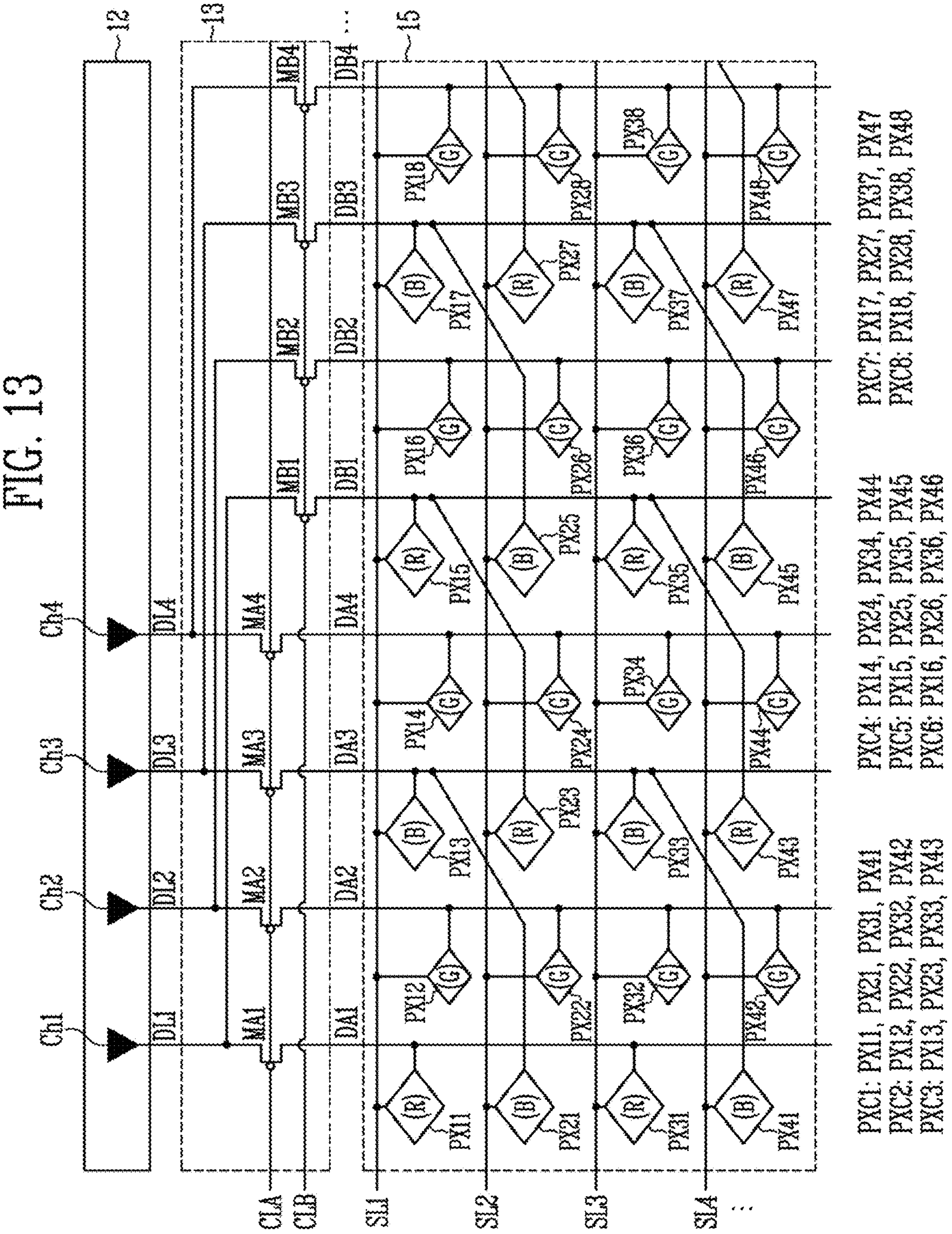
FIG. 13 is a schematic diagram for describing an embodiment in which a demultiplexer is added to the display device including the PENTILE pixel structure of FIG. 4B.
Figure 14:
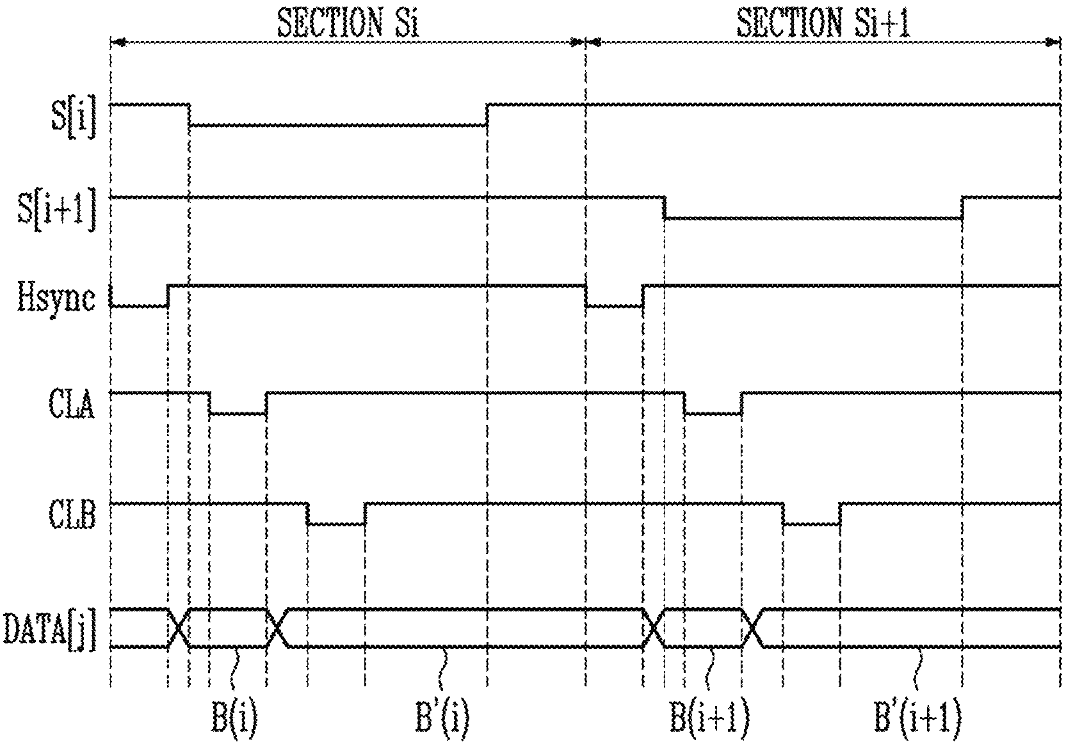
FIG. 14 is a signal diagram for describing a method of driving the display device illustrated in FIG. 13 in accordance with an embodiment.
Figure 15A:
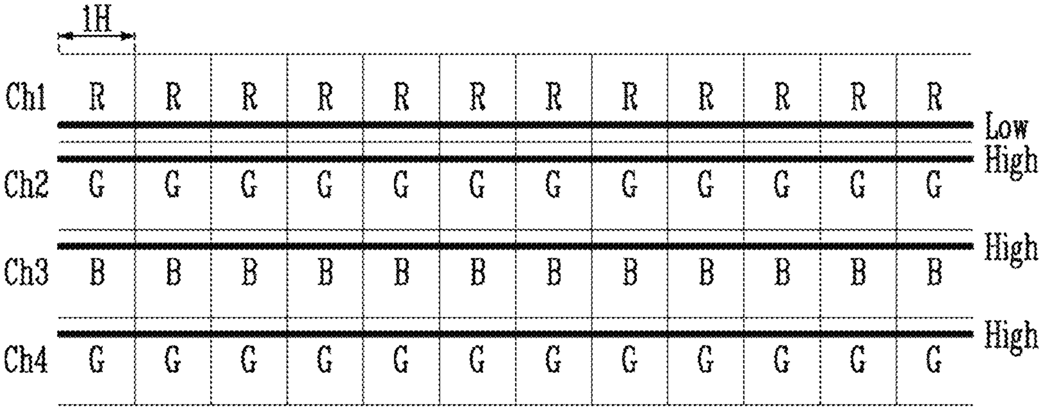
FIGS. 15A to 15C are diagrams for describing data signals to be provided to the respective source channels in accordance with an embodiment illustrated in FIG. 13.
Figure 15B:
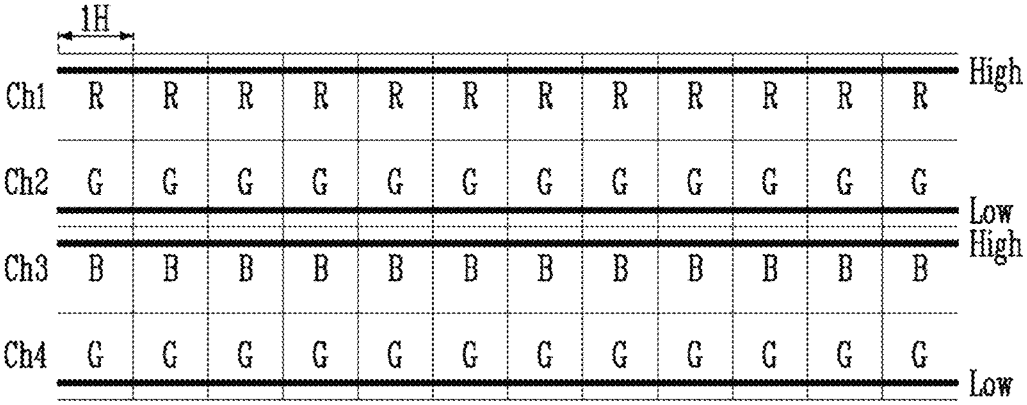
Figure 15C:
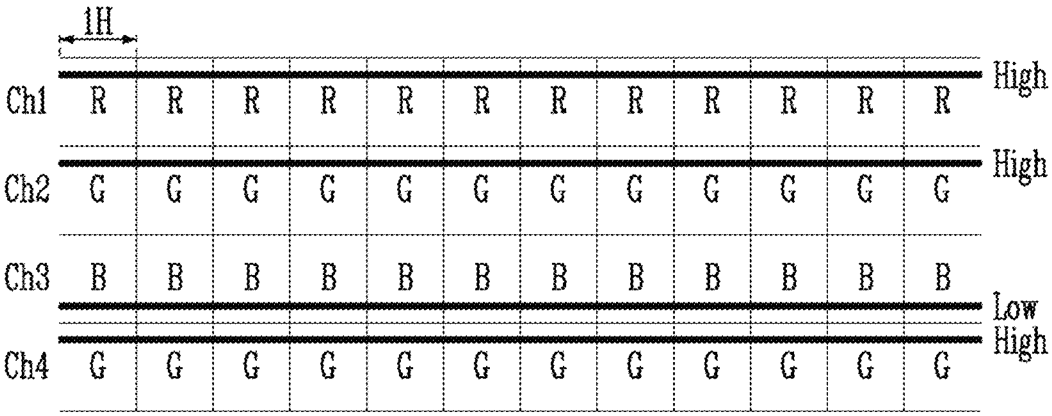

FIG. 13 is a schematic diagram for describing an embodiment in which a demultiplexer 13 is added to the display device including the PENTILE pixel structure of FIG. 4B. FIG. 14 is a signal diagram for describing a method of driving the display device illustrated in FIG. 13 in accordance with an embodiment. FIGS. 15A to 15C are diagrams for describing data signals to be provided to the respective source channels in accordance with an embodiment illustrated in FIG. 13.

Referring to FIGS. 1 and 13, the demultiplexer 13 may include a plurality of first select transistors MA1, MA2, MA3, MA4, . . . , and a plurality of second select transistors MB1, MB2, MB3, MB4, . . . which may be turned on or off depending on a fourth driving control signal DMCS.

The demultiplexer 13 may generate, based on the fourth driving control signal DMCS, a first select signal CLA for controlling the plurality of first select transistors MA1, MA2, MA3, MA4, . . . , and a second select signal CLB for controlling the plurality of second select transistors MB1, MB2, MB3, MB4, . . . . In an embodiment, the first select signal CLA and the second select signal CLB may be included in the fourth driving control signal DMCS.

Each of the plurality of first select transistors MA1, MA2, MA3, MA4, . . . may include a gate electrode to which the first select signal CLA is to be applied, a first electrode connected to a corresponding data line DL1, DL2, DL3, DL4, . . . , and a second electrode connected to a corresponding first sub-data line DA1, DA2, DA3, DA4, . . . .

Each of the plurality of second select transistors MB1, MB2, MB3, MB4, . . . may include a gate electrode to which the second select signal CLB is to be applied, a first electrode connected to a corresponding data line DL1, DL2, DL3, DL4, . . . , and a second electrode connected to a corresponding second sub-data line DB1, DB2, DB3, DB4, . . . .

The first sub-data lines DA1, DA2, DA3, DA4, . . . may include a 1-1-th sub-data line DA1 connected to the sub-pixels PX11 and PX31 that are disposed on the first pixel column PXC1 and configured to emit red light (R), a 1-2-th sub-data line DA2 connected to the sub-pixels PX12, PX22, PX32, and PX42 that are disposed on the second pixel column PXC2 and configured to emit green light (G), a 1-3-th sub-data line DA3 connected to the sub-pixels PX13, PX21, PX33, and PX41 that are disposed on the third pixel column PXC3 and configured to emit blue light (B), and a 1-4-th sub-data line DA4 connected to the sub-pixels PX14, PX24, PX34, and PX44 that are disposed on the fourth pixel column PXC4 and configured to emit green light (G). The 1-1-th sub-data line DA1 may be supplied with only a first color data signal. The 1-2-th sub-data line DA2 and the 1-4-th sub-data line DA4 each may be supplied with only a second color data signal. The 1-3-th sub-data line DA3 may be supplied with only a third color data signal.

Furthermore, the second sub-data lines DB1, DB2, DB3, DB4, . . . may include a 2-1-th sub-data line DB1 connected to the sub-pixels PX15, PX23, PX35, and PX43 that are disposed on the fifth pixel column PXC5 and configured to emit red light (R), a 2-2-th sub-data line DB2 connected to the sub-pixels PX16, PX26, PX36, and PX46 that are disposed on the sixth pixel column PXC6 and configured to emit green light (G), a 2-3-th sub-data line DB3 connected to the sub-pixels PX17, PX25, PX37, and PX45 that are disposed on the seventh pixel column PXC7 and configured to emit blue light (B), and a 2-4-th sub-data line DB4 connected to the sub-pixels PX18, PX28, PX38, and PX48 that are disposed on the eighth pixel column PXC8 and configured to emit green light (G). The 2-1-th sub-data line DB1 may be supplied with only a first color data signal. The 2-2-th sub-data line DB2 and the 2-4-th sub-data line DB4 each may be supplied with only a second color data signal. The 2-3-th sub-data line DB3 may be supplied with only a third color data signal.

In accordance with an embodiment, the sub-pixels connected to the first sub-data lines DAL, DA2, DA3, DA4 may be referred to as a first group, and the sub-pixels connected to the second sub-data lines DB1, DB2, DB3, DB4 may be referred to as a second group, which is disposed adjacent to the first group in a pixel row direction. Thus, the demultiplexer 13 may be connected both to the first sub-data lines DA1, DA2, DA3, DA4 which are connected to the sub-pixels (e.g., first color pixels to third color pixels) that are included in the first group, and to the second sub-data lines DB1, DB2, DB3, DB4 which are connected to the sub-pixels (e.g., first color pixels to third color pixels) included in the second group disposed.

The plurality of first select transistors MA1, MA2, MA3, MA4, . . . and the plurality of second select transistors MB1, MB2, MB3, MB4, . . . each may be a PMOS transistor. Agate-on voltage of the PMOS transistor may be a low level voltage, and a gate-off voltage thereof may be a high level voltage. However, embodiments of the present disclosure are not limited thereto. For example, at least one of the plurality of first select transistors MA1, MA2, MA3, MA4, . . . and the plurality of second select transistors MB1, MB2, MB3, MB4, . . . may be an NMOS transistor. Agate-on voltage of the NMOS transistor may be a high level voltage, and a gate-off voltage thereof may be a low level voltage.

The first select signal CLA and the second select signal CLB may be successively applied at a gate-on voltage, on a scan line basis. For example, the first select signal CLA may be applied at a gate-on voltage and then changed to a gate-off voltage, and thereafter the second select signal CLB may be applied at a gate-on voltage.

The data driver 12 may apply, while the first select signal CLA is applied at a gate-on voltage, all of a first color data signal corresponding to a plurality of sub-pixels PXij configured to emit red light (R), a second color data signal corresponding to a plurality of sub-pixels PXij configured to emit green light (G), and a third color data signal corresponding to a plurality of sub-pixels PXij configured to emit blue light (B) to each of the plurality of data lines DL1, DL2, DL3, DL4, . . . , and may apply, while the second select signal CLB is applied at a gate-on voltage, all of a first color data signal corresponding to a plurality of sub-pixels PXij configured to emit red light (R), a second color data signal corresponding to a plurality of sub-pixels PXij configured to emit green light (G), and a third color data signal corresponding to a plurality of sub-pixels PXij configured to emit blue light (B) to each of the plurality of data lines DL1, DL2, DL3, DL4, . . . .

The first source channel Ch1 may supply only a first color data signal corresponding to the sub-pixels PX11 and PX31 configured to emit red light (R). The second source channel Ch2 may supply only a second color data signal corresponding to the sub-pixels PX12, PX22, PX32, and PX41 configured to emit green light (G). The third source channel Ch3 may supply only a third color data signal corresponding to the sub-pixels PX13, PX21, PX33, and PX41 configured to emit blue light (B). The fourth source channel Ch4 may supply only a second color data signal corresponding to the sub-pixels PX14, PX24, PX34, and PX44 configured to emit green light (G).

Here, the types of data signals to be supplied by each of the source channels Ch1, Ch2, Ch3, Ch4, . . . are not limited thereto. For example, the first source channel Ch1 may supply only a third color data signal corresponding to the sub-pixels PX11 and PX31 configured to emit blue light (B). The second source channel Ch2 may supply only a second color data signal corresponding to the sub-pixels PX12, PX22, PX32, and PX42 configured to emit green light (G). The third source channel Ch3 may supply only a third color data signal corresponding to the sub-pixels PX13, PX21, PX33, and PX41 configured to emit red light (R). The fourth source channel Ch4 may supply only a second color data signal corresponding to the sub-pixels PX14, PX24, PX34, and PX44 configured to emit green light (G).

Referring to FIGS. 13 and 14, for convenience of explanation, FIG. 14 illustrates section Si in which a data signal corresponding to an i-th scan line SLi is applied, and section Si+1 in which a data signal corresponding to an i+1-th scan line SLi+1 is applied (where i is a natural number). Furthermore, FIG. 14 illustrates a data signal DATA [j] to be applied to a j-th data line DLj (where j is a natural number). Hereinafter, for convenience of explanation, embodiments will be described based on the assumption that the j-th data line DLj is a third data line DL3.

In synchronization with a horizontal synchronization signal Hsync, the first select signal CLA and the second select signal CLB may be successively applied at a gate-on voltage. A section in which the first select signal CLA and the second select signal CLB are applied at a gate-on voltage may be included in a section in which the scan signals S[i] and S[i+1] are applied at a gate-on voltage.

For example, in section Si, the data signal DATA[j] may be applied as a third color data signal (e.g., B(i)) corresponding to the i-th scan line SLi in response to the first select signal CLA having a gate-on voltage. The first select transistor (e.g., MA3) may be turned on by the first select signal CLA having a gate-on voltage. As a result, the third color data signal (e.g., B(i)) may be applied to the 1-3-th sub-data line DA3 through the turned-on first select transistor (e.g., MA3).

Subsequently, the data signal DATA[j] may be applied as a third color data signal (e.g., B'(i)) corresponding to the i-th scan line SLi in response to the second select signal CLB having a gate-on voltage. The second select transistor (e.g., MB3) may be turned on by the second select signal CLB having a gate-on voltage. As a result, the third color data signal (e.g., B'(i)) may be applied to the 2-3-th sub-data line DB3 through the turned-on second select transistor (e.g., MB3).

In section Si+1, the data signal DATA[j] may be applied as a third color data signal (e.g., B(i+1)) corresponding to the i+1-th scan line SLi+1 in response to the first select signal CLA having a gate-on voltage. The first select transistor (e.g., MA3) may be turned on by the first select signal CLA having a gate-on voltage. As a result, the third color data signal (e.g., B(i+1)) may be applied to the 1-3-th sub-data line DA3 through the turned-on first select transistor (e.g., MA3).

Subsequently, the data signal DATA[j] may be applied as a third color data signal (e.g., B'(i+1)) corresponding to the i+1-th scan line SLi+1 in response to the second select signal CLB having a gate-on voltage. The second select transistor (e.g., MB3) may be turned on by the second select signal CLB having a gate-on voltage. As a result, the third color data signal (e.g., B'(i+1)) may be applied to the 2-3-th sub-data line DB3 through the turned-on second select transistor (e.g., MB3).

Data signals to be supplied to the respective source channels will be described in detail with reference to FIGS. 15A to 15C. Here, for convenience of explanation, a pattern expressed on the display panel 15 will be described with reference to an embodiment in which any one of a red pattern (R), a green pattern (G), and a blue pattern (B)

having the maximum grayscale (e.g., grayscale 255) is expressed on the entirety of a screen.

Referring to FIG. 15A, in the display device 1 in accordance with an embodiment illustrated in FIG. 13, to express a red pattern (R) of grayscale 255 on the display panel 15, the first source channel Ch1 may supply two red data signals corresponding to grayscale 255 to the first data line DL1 during each one horizontal period 1H. In addition, the second and fourth source channels Ch2 and Ch4 may respectively supply two green data signals corresponding to grayscale 0 to the second and fourth data lines DL2 and DL4 during each one horizontal period 1H. Furthermore, the third source channel Ch3 may supply two blue data signals corresponding to grayscale 0 to the third data line DL3 during each one horizontal period 1H.

Referring to FIG. 15B, in the display device 1 in accordance with an embodiment illustrated in FIG. 13, to express a green pattern (G) of grayscale 255 on the display panel 15, the first source channel Ch1 may supply two red data signals corresponding to grayscale 0 to the first data line DL1 during each one horizontal period 1H. In addition, the second and fourth source channels Ch2 and Ch4 may respectively supply two green data signals corresponding to grayscale 255 to the second and fourth data lines DL2 and DL4 during each one horizontal period 1H. Furthermore, the third source channel Ch3 may supply two blue data signals corresponding to grayscale 0 to the third data line DL3 during each one horizontal period 1H.

Referring to FIG. 15C, in the display device 1 in accordance with an embodiment illustrated in FIG. 13, to express a blue pattern (B) of grayscale 255 on the display panel 15, the first source channel Ch1 may supply two red data signals corresponding to grayscale 0 to the first data line DL1 during each one horizontal period 1H. In addition, the second and fourth source channels Ch2 and Ch4 may respectively supply two green data signals corresponding to grayscale 0 to the second and fourth data lines DL2 and DL4 during each one horizontal period 1H. Furthermore, the third source channel Ch3 may supply two blue data signals corresponding to grayscale 255 to the third data line DL3 during each one horizontal period 1H.

In accordance with an embodiment illustrated in FIG. 13, to express the red pattern (R) on the display panel 15, the first source channel Ch1 may supply, during each one horizontal period 1H, only a red data signal having an identical voltage level (e.g., a logic low level) to the first data line DL1 to which only the sub-pixels PXij configured to emit red light (R) are connected. To express the blue pattern (B) on the display panel 15, the third source channel Ch3 may supply, during each one horizontal period 1H, only a blue data signal having an identical voltage level (e.g., a logic low level) to the third data line DL3 to which only the sub-pixels PXij configured to emit blue light (B) are connected. Hence, an increase in power consumption due to toggling may be mitigated compared to, for example, an embodiment according to FIG. 10 in which, to express a red pattern (R) on the display panel 15, the first source channel Ch1 alternately supplies a red data signal (e.g., a logic low level) corresponding to grayscale 255 and a green data signal (e.g., a logic high level) corresponding to grayscale 0 during each one horizontal period 1H, and to express a blue pattern (B) on the display panel 15, the second source channel Ch2 alternately supplies a blue data signal (e.g., a logic low level) corresponding to grayscale 255 and a green data signal (e.g., a logic high level) corresponding to grayscale 0 during each one horizontal period 1H.

A display device in accordance with an embodiment of the present disclosure may have a PENTILE pixel structure in which, to prevent a red data signal and a blue data signal having different voltage levels from being switched during each one horizontal period, some red sub-pixels and some blue sub-pixels each have an anode extension structure. As a result, in embodiments, a data signal pertaining to only one color may be more efficiently supplied to each data line by using a demultiplexer.

In a PENTILE pixel structure according to a comparative example, sub-pixels configured to emit red light and sub-pixels configured to emit blue light may be alternately connected to an identical data line in an extension direction of the data line, and sub-pixels configured to emit green light may be successively connected to an identical data line in an extension direction of the data line. The data line connected to the sub-pixels configured to emit green light may supply only a green data signal during each one horizontal period. The data line connected to the sub-pixels configured to emit red light and blue light may alternately supply, during each one horizontal period, a red data signal and a blue data signal that have different voltage levels. Since voltages having different levels are supplied during each one horizontal period to the data line connected to the sub-pixels configured to emit different colors of light, peak current may increase each time the voltage level of a data signal changes. Consequently, power consumption may increase. Embodiments of the present disclosure described herein may prevent or reduce such an increase in power consumption, as described above.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

However, effects of the present disclosure are not limited to the above-described effects, and various modifications are possible without departing from the spirit and scope of embodiments of the present disclosure.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:

a display panel comprising a first pixel column in which first color pixels and third color pixels are alternately disposed in a listed order, a second pixel column in which second color pixels are disposed, a third pixel column in which the third color pixels and the first color pixels are alternately disposed in a listed order, a fourth pixel column in which the second color pixels are disposed, and a fifth pixel column in which the first color pixels and the third color pixels are alternately disposed in a listed order;

a scan driver configured to successively apply a scan signal having a gate-on voltage to scan lines connected to the first color pixels, the second color pixels, and the third color pixels;

a data driver comprising a first source channel configured to supply a first color data signal corresponding to the first color pixels and a second color data signal corresponding to the second color pixels to a first data line, a second source channel configured to supply the second color data signal and a third color data signal corresponding to the third color pixels to a second data line, and a third source channel configured to supply the first color data signal to a third data line; and a demultiplexer connected both to a plurality of first sub-data lines connected to the first color pixels or the third color pixels, and to a plurality of second sub-data lines connected to the second color pixels, and configured to successively select the first sub-data lines and the second sub-data lines during a period in which the scan signal having a gate-on level is supplied to each scan line, wherein the first sub-data lines comprise a 1-1-th sub-data line connected to the first color pixels in the first pixel column, a 1-2-th sub-data line connected to the third color pixels in the first and third pixel columns, and a 1-3-th sub-data line connected to the first color pixels in the third and fifth pixel columns, wherein each of the first color pixels disposed in an odd-numbered pixel row comprises a first anode and a first connection portion electrically connecting the first anode and a pixel circuit of the corresponding first color pixel, wherein each of the first color pixels disposed in an even-numbered pixel row comprises a second anode and a second connection portion electrically connecting the second anode and a pixel circuit of the corresponding first color pixel, and wherein a length of the first connection portion differs from a length of the second connection portion.

2. The display device according to claim 1, wherein the length of the first connection portion is shorter than the length of the second connection portion.

3. The display device according to claim 1, wherein each of the third color pixels disposed in the odd-numbered pixel row comprises a third anode and a third connection portion electrically connecting the third anode and a pixel circuit of the corresponding third color pixel, wherein each of the third color pixels disposed in the even-numbered pixel row comprises a fourth anode and a fourth connection portion electrically connecting the fourth anode and a pixel circuit of the corresponding third color pixel, and wherein a length of the third connection portion differs from a length of the fourth connection portion.

4. The display device according to claim 3, wherein the length of the third connection portion is shorter than the length of the fourth connection portion.

5. The display device according to claim 1, wherein the demultiplexer repeatedly selects the first sub-data lines and the second sub-data lines on a scan line basis.

6. The display device according to claim 1, wherein the 1-1-th and 1-3-th sub-data lines are supplied with only the first color data signal, the 1-2-th sub-data line is supplied with only the third color data signal.

7. The display device according to claim 1, wherein the second sub-data lines comprise a 2-1-th sub-data line connected to the second color pixels disposed in the second pixel column, and a 2-2-th sub-data line connected to the second color pixels disposed in the fourth pixel column.

8. The display device according to claim 7, wherein the 2-1-th and 2-2-th sub-data lines are supplied with only the second color data signal.

9. The display device according to claim 7, wherein the demultiplexer comprises:

a plurality of first select transistors disposed between the first data line and the 1-1-th sub-data line, between the second data line and the 1-2-th sub-data line, and between the third data line and the 1-3-th sub-data line; and a plurality of second select transistors disposed between the first data line and the 2-1-th sub-data line and between the second data line and the 2-2-th sub-data line.

10. The display device according to claim 9, wherein, when the display panel express a red pattern, the first select transistor disposed between the first data line and the 1-1-th sub-data line among the plurality of first select transistors is turned on and the first source channel supplies the first color data signal to the 1-1-th sub-data line, and the first select transistor between the third data line and the 1-3-th sub-data line among the plurality of first select transistors is turned on and the third source channel supplies the first color data signal to the 1-3-th sub-data line.

11. The display device according to claim 9, wherein, when the display panel express a green pattern, the second select transistor disposed between the first data line and the 2-1-th sub-data line among the plurality of second select transistors is turned on and the first source channel supplies the second color data signal to the 2-1-th sub-data line, and the second select transistor between the second data line and the 2-2-th sub-data line among the plurality of second select transistors is turned on and the second source channel supplies the second color data signal to the 2-2-th sub-data line.

12. The display device according to claim 9, wherein, when the display panel express a blue pattern, the first select transistor disposed between the second data line and the 1-2-th sub-data line among the plurality of first select transistors is turned on and the second source channel supplies the third color data signal to the 1-2-th sub-data line.

13. The display device according to claim 1, wherein each of the second color pixels disposed in the odd-numbered pixel row comprises a fifth anode and a fifth connection portion electrically connecting the fifth anode and a pixel circuit of the corresponding second color pixel, wherein each of the second color pixels disposed in the even-numbered pixel row comprises a sixth anode and a sixth connection portion electrically connecting the sixth anode and a pixel circuit of the corresponding second color pixel, and wherein a length of the fifth connection portion is the same as a length of the sixth connection portion.

14. The display device according to claim 1, wherein a color of the first color pixels is red, a color of the second color pixels is green, and a color of the third color pixels is blue.

* * * * *